United States Patent
Owada et al.

(10) Patent No.: US 12,538,008 B2
(45) Date of Patent: Jan. 27, 2026

(54) DETERMINATION DEVICE, IDENTIFICATION METHOD AND RECORDING MEDIUM

(71) Applicant: NEC Corporation, Tokyo (JP)

(72) Inventors: Takahiro Owada, Tokyo (JP); Mineto Satoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/683,872

(22) PCT Filed: Aug. 30, 2021

(86) PCT No.: PCT/JP2021/031695
§ 371 (c)(1),
(2) Date: Feb. 15, 2024

(87) PCT Pub. No.: WO2023/031991
PCT Pub. Date: Mar. 9, 2023

(65) Prior Publication Data
US 2024/0348911 A1    Oct. 17, 2024

(51) Int. Cl.
*H04N 23/61* (2023.01)
*H04N 23/695* (2023.01)

(52) U.S. Cl.
CPC ........... *H04N 23/61* (2023.01); *H04N 23/695* (2023.01)

(58) Field of Classification Search
CPC ......... H04N 23/61; H04N 23/695; G06T 7/00
See application file for complete search history.

(56) References Cited

U.S. PATENT DOCUMENTS

| | | | |
|---|---|---|---|
| 2019/0389065 A1* | 12/2019 | Horiguchi | G01B 21/047 |
| 2020/0094406 A1* | 3/2020 | Kusano | G06T 7/70 |
| 2021/0072734 A1* | 3/2021 | Hirota | G06N 3/0464 |
| 2021/0150185 A1* | 5/2021 | Kitagawa | G06V 10/772 |
| 2021/0178593 A1* | 6/2021 | Ye | B25J 9/1612 |
| 2021/0276197 A1* | 9/2021 | Ye | B25J 13/08 |
| 2022/0092765 A1* | 3/2022 | Song | G06T 7/0004 |
| 2023/0078604 A1* | 3/2023 | Rein | G06T 7/73 382/103 |
| 2023/0306625 A1* | 9/2023 | Peruch | G06K 7/1413 |

FOREIGN PATENT DOCUMENTS

| | | |
|---|---|---|
| JP | 2014-200882 A | 10/2014 |
| JP | 2018-143416 A | 9/2018 |
| WO | 2020/049768 A1 | 3/2020 |

OTHER PUBLICATIONS

International Search Report for PCT Application No. PCT/JP2021/031695, mailed on Nov. 16, 2021.
English translation of Written opinion for PCT Application No. PCT/JP2021/031695, mailed on Nov. 16, 2021.

* cited by examiner

*Primary Examiner* — Howard D Brown, Jr.
(74) *Attorney, Agent, or Firm* — Sughrue Mion, PLLC

(57) ABSTRACT

The determination device is provided with an identification unit and a determination unit. The identification unit identifies a direction extending from inside to outside of an object in image data or position data. The determination unit then determines whether the identified direction satisfies criteria that indicate that information relating to the object is missing.

10 Claims, 19 Drawing Sheets

<SEARCH RANGE WITHIN RADIUS r FROM POINT P1>

DETERMINATION DEVICE, IDENTIFICATION METHOD AND RECORDING MEDIUM

This application is a National Stage Entry of PCT/JP2021/031695 filed on Aug. 30, 2021, the contents of all of which are incorporated herein by reference, in their entirety.

TECHNICAL FIELD

The present disclosure relates to, for example, an identification system and the like capable of providing information indicating an object to be recognized in control of a robot, a conveyance device, or the like.

BACKGROUND ART

For a device that grips and conveys an object, there is a method of capturing an image by moving a camera in order to expand an imaging range of the camera for detecting the object and compensate for missing of information of the object due to obstructing or the like.

For example, a hand-eye system in which a camera is attached to a distal end of a robot arm is known (see, for example, PTL 1). PTL 1 describes that a mobile robot senses regions of a plurality of objects placed, and analyzes sensor information indicating results of the sensing. PTL 1 describes that, in a case where a plurality of objects is included in an imaging range of a sensor, a sensing position is updated in such a way that any one of the objects is at the center of the imaging range.

CITATION LIST

Patent Literature

PTL 1: WO 2020/049768 A

SUMMARY OF INVENTION

Technical Problem

In a case where an image of an object and surroundings of the object is captured, a part of data of the object in data obtained by the image capturing may be missing due to obstructing or an angle of view. However, it may not be possible to identify which part of the data of the object is missing.

An example of an object of the present disclosure is to provide a determination device and the like capable of estimating a missing portion of an object in data captured of the object.

Solution to Problem

A determination device according to an aspect of the present disclosure includes an identification means that identifies a direction extending from inside to outside of an object in image data or position data, and a determination means that determines whether the identified direction satisfies criteria indicating that information relating to the object is missing.

A control device according to an aspect of the present disclosure includes an identification means that identifies a direction extending from inside to outside of an object in image data or position data generated by an imaging device, a determination means that determines a position of the imaging device in such a way that an angle of view of the imaging device includes the direction in a case where the identified direction satisfies criteria indicating that information relating to the object is missing, and a control means that controls the position of the imaging device in such a way that the imaging device is at the position.

A determination method according to an aspect of the present disclosure includes identifying a direction extending from inside to outside of an object in image data or position data, and determining whether the identified direction satisfies criteria indicating that information relating to the object is missing.

A control method according to an aspect of the present disclosure includes identifying a direction extending from inside to outside of an object in image data or position data generated by an imaging device, determining a position of the imaging device in such a way that an angle of view of the imaging device includes the direction in a case where the identified direction satisfies criteria indicating that information relating to the object is missing, and controlling the position of the imaging device in such a way that the imaging device is at the determined position.

A non-transitory computer-readable recording medium according to an aspect of the present disclosure records a program for causing a computer to execute processing of identifying a direction extending from inside to outside of an object in image data or position data, and determining whether the identified direction satisfies criteria indicating that information relating to the object is missing.

A non-transitory computer-readable recording medium according to an aspect of the present disclosure records a program for causing a computer to execute processing of identifying a direction extending from inside to outside of an object in image data or position data generated by an imaging device, determining a position of the imaging device in such a way that an angle of view of the imaging device includes the direction in a case where the identified direction satisfies criteria indicating that information relating to the object is missing, and controlling the position of the imaging device in such a way that the imaging device is at the determined position.

Advantageous Effects of Invention

According to the present disclosure, it is possible to estimate a missing portion of an object in data captured of the object.

BRIEF DESCRIPTION OF DRAWINGS

FIG. 5 is a diagram illustrating three-dimensional point cloud data of an object that is not obstructed or the like.

EXAMPLE EMBODIMENT

Hereinafter, example embodiments of a determination device, a control device, an identification method, a control method, a program, and a non-transitory recording medium recording the program according to the present disclosure will be described in detail with reference to the drawings. The present example embodiment does not limit the disclosed technology. The following description and drawings are omitted and simplified as appropriate for clarity of description.

First Example Embodiment

In a first example embodiment, as an example of a determination device, a case where each functional unit of the determination device and a sensor unit that is an imaging device are implemented by one device will be described as an example. In the first example embodiment, this device is referred to as an unknown region identifying device. In the first example embodiment, a method of identifying a search direction or the like will be described.

Figure 1:
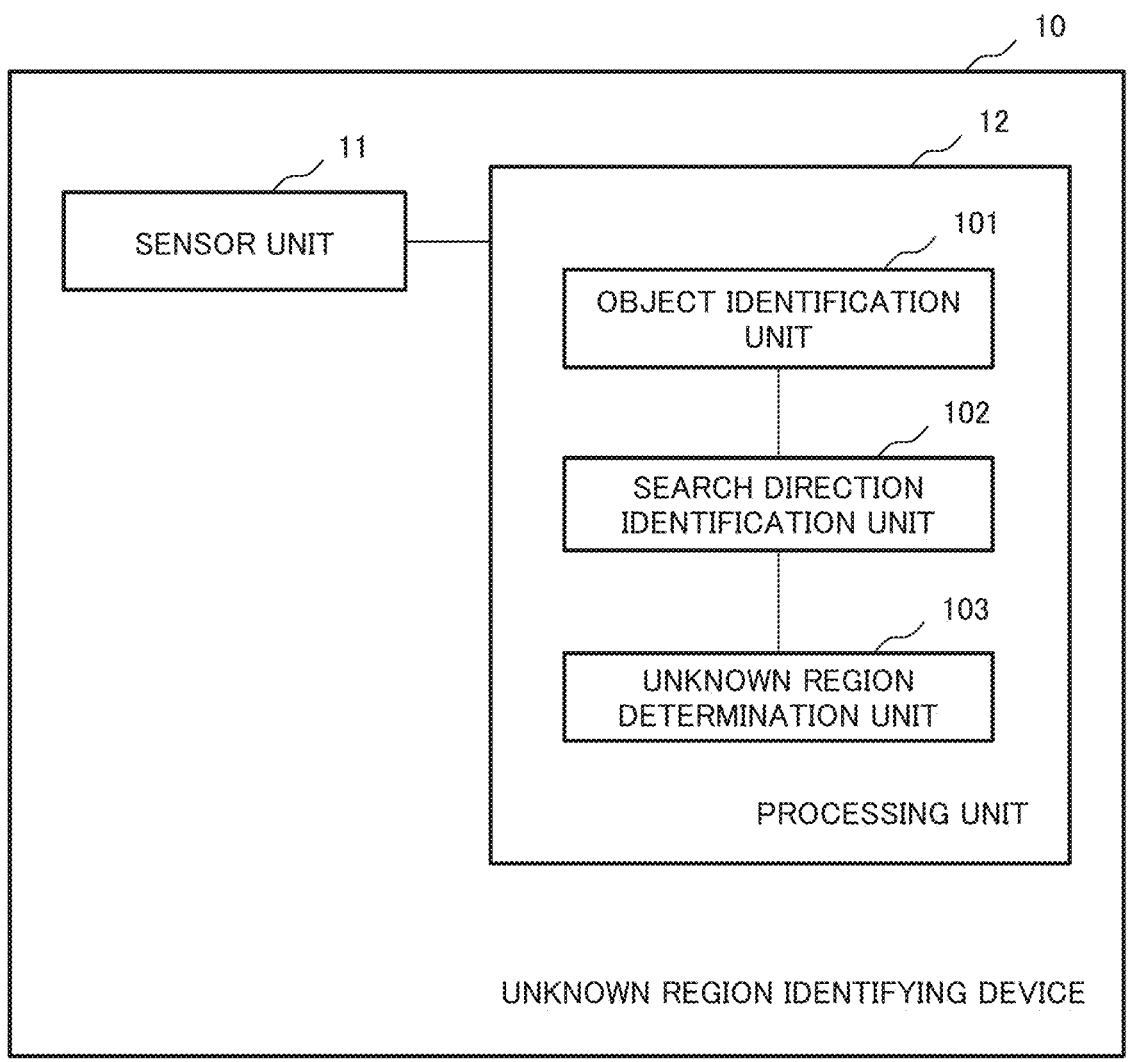
FIG. 1 is a block diagram illustrating a configuration example of an unknown region identifying device according to a first example embodiment.

A configuration example of the unknown region identifying device according to the first example embodiment will be described with reference to FIG. 1. FIG. 1 is a block diagram illustrating the configuration example of the unknown region identifying device according to the first example embodiment. For example, the unknown region identifying device 10 captures an image of an object placed on a work table, and identifies, based on information indicating the object of which the image was captured, a search direction indicating a partial region in which information indicating the object is missing. For example, when an object different from the object of interest (hereinafter referred to as a "target object") obstructs the object of interest or the target object is outside the imaging range of the imaging device, information indicating a partial region of the target object may be missing.

The unknown region identifying device 10 includes a sensor unit 11 and a processing unit 12. The sensor unit 11 includes the imaging device as described later. The unknown region identifying device 10 is installed in such a way that the imaging position of the sensor unit 11 can be changed. Specifically, the unknown region identifying device 10 may be mounted on a mobile object, for example. The type of the mobile object is not particularly limited. For example, the unknown region identifying device 10 may be mounted on a robot. As a result, the unknown region identifying device 10 is applied to a robot task. For example, the unknown region identifying device 10 may be mounted on a mobile object such as an automatic guided vehicle (AGV), a backhoe, an automobile, or a drone.

The unknown region identifying device 10 includes the sensor unit 11 and the processing unit 12. A processing result of each functional unit may be stored in, for example, a memory to be described later.

The sensor unit 11 includes, for example, at least any one of imaging devices such as a charge coupled device (CCD) camera, a stereo camera, a time-of-flight (ToF) camera, a millimeter wave radar, and a light detection and ranging or laser imaging, detection, and ranging (LiDAR). That is, the sensor unit 11 includes one or a plurality of sensors (imaging devices). For example, the sensor unit 11 captures an image of an object placed on a work table or the like or an object around the work table to generate image data representing the captured image or position data representing the position of at least one of these objects. The sensor unit 11 outputs the generated data to the processing unit 12.

The image data is data indicating the image, and includes information indicating the position of each object and information indicating a color of the object at the position in a two-dimensional coordinate system. The two-dimensional coordinate system is assumed to be a coordinate system having an X axis and a Y axis as coordinate axes.

The position data represents, for example, a distance from the imaging device to the target object. The position data may be, for example, data representing a three-dimensional point cloud.

The data representing the three-dimensional point cloud is, for example, RGB-D data or depth data. The data representing the three-dimensional point cloud includes information (hereinafter referred to as "position information") representing the position of each point and information (hereinafter referred to as "color information") representing a color of the object at the position. A three-dimensional coordinate system is assumed to be a coordinate system having an X axis, a Y axis, and a Z axis as coordinate axes. The color information is a gray value, and is not particularly limited. Hereinafter, in a case where it is described as three-dimensional point cloud data, the three-dimensional point cloud data represents RGB-D data obtained from the sensor unit 11, depth data obtained from the sensor unit 11, or data obtained from these pieces of data. As described later, the data obtained from these pieces of data is a part of data extracted from the three-dimensional point cloud data or data obtained by integrating a plurality of pieces of data.

The processing unit 12 derives a direction indicating missing of information due to obstructing, the outside of the imaging range, or the like based on the image data, RGB-D data, or depth data generated by the sensor unit 11. The processing unit 12 includes an object identification unit 101, a search direction identification unit 102, and an unknown region determination unit 103.

The object identification unit 101 identifies a region of the object. The object identification unit 101 receives the image data or the position data output from the sensor unit 11 as an input. As described above, the position data is the RGB-D data or the depth data.

First, an example using RGB-D or depth data will be described.

The object identification unit 101 identifies a three-dimensional point cloud representing a target object in such a way as to identify the target object and a surrounding environment other than the target object from a three-dimensional point cloud represented by the RGB-D or depth data in a three-dimensional space. The surrounding environment is a work table on which the target object is placed, a ground or a floor on which the object is placed, or the like. For example, in a case where the object of which an image is to be captured is placed on the work table or the ground, the object identification unit 101 may identify a three-dimensional point cloud representing a flat surface of the work table or the ground by a plane removal method or the like from a three-dimensional point cloud represented by data generated by the sensor unit 11, and extract a point cloud other than the identified three-dimensional point cloud as a three-dimensional point cloud constituting the object.

Then, the object identification unit 101 identifies a region of the object from the extracted three-dimensional point cloud. For example, as a method of identifying the region of the object, the object identification unit 101 identifies a three-dimensional point cloud representing the object based on a distance between a point and an adjacent point present around the point. The points in the three-dimensional point cloud representing the object are dense. On the other hand, the point cloud representing anything other than the object is at a position away from the three-dimensional point cloud representing the object. The object identification unit 101 identifies whether a point present around a point representing the object is a point representing the object, based on whether a distance between the point representing the object and the point present around the point representing the object is short. A distance for determining whether two points are adjacent is referred to as a predetermined distance. The predetermined distance is not particularly limited. The predetermined distance may be a value set by a user who uses the unknown region identifying device 10. As the predetermined distance, a distance between points (for example, the minimum distance) may be calculated in advance from the resolving power (point cloud density) of the sensor unit 11, and the calculated distance may be set. In other words, when the distance between two points satisfies a criterion for determining that the two points are adjacent to each other (for example, within a predetermined distance), the two points are adjacent to each other. When the distance between the two points does not satisfy the criterion for determining that the two points are adjacent to each other (for example, the distance is longer than the predetermined distance), the two points are not adjacent to each other.

More specifically, as a method of identifying a three-dimensional point cloud representing an object, for example, the object identification unit 101 selects a certain point from an input three-dimensional point cloud (RGB-D data or depth data) as an anchor point which is a search starting point, and performs a neighborhood search of searching for a neighboring point within a certain distance (the above-described predetermined distance) from the anchor point. A method of selecting the anchor point is not limited to the above-described example. The anchor point may be randomly selected from the three-dimensional point cloud, or a point present at the center of a region surrounded by the contour of the object may be selected. The contour of the object may be extracted by contour extraction or the like. Then, the object identification unit 101 sets a neighboring point within the certain distance from the anchor point as the next anchor point. The object identification unit 101 performs a neighborhood search again from the set anchor point. The object identification unit 101 repeats the neighborhood search until no new neighboring point is found, and extracts a point cloud representing the object.

Processing of the object identification unit 101 in a case where image data is used will be described. The object identification unit 101 may identify the region of the object by processing of extracting the contour from the image data on based on the image data. Alternatively, the object identification unit 101 may identify the region of the object by performing segmentation, clustering, and the like according to a specific color after performing decoloring processing on the color information included in the image data. This specific color is a color of the object.

The search direction identification unit 102 receives data indicating the region of the object identified by the object identification unit 101 as an input. As described above, the received data is three-dimensional point cloud data indicating the region of the object or image data indicating the region of the object. The search direction identification unit 102 identifies each search direction extending from the inside of the identified region of the object to the outside of the region of the object.

First, an example in which the search direction identification unit 102 identifies a search direction using the three-dimensional point cloud data will be described.

Specifically, for example, the search direction identification unit 102 identifies, as the search direction, a direction identified by a neighborhood search between an anchor point used by the object identification unit 101 and a point adjacent to the anchor point. The search direction is, for example, a direction from a start point to an end point when the anchor point is set as the start point and the point adjacent to the start point is set as the end point. The search direction identification unit 102 may identify a length from the start point and the end point in the search direction. The anchor point may be selected from the center of the contour of the object or may be selected randomly.

Figure 2:
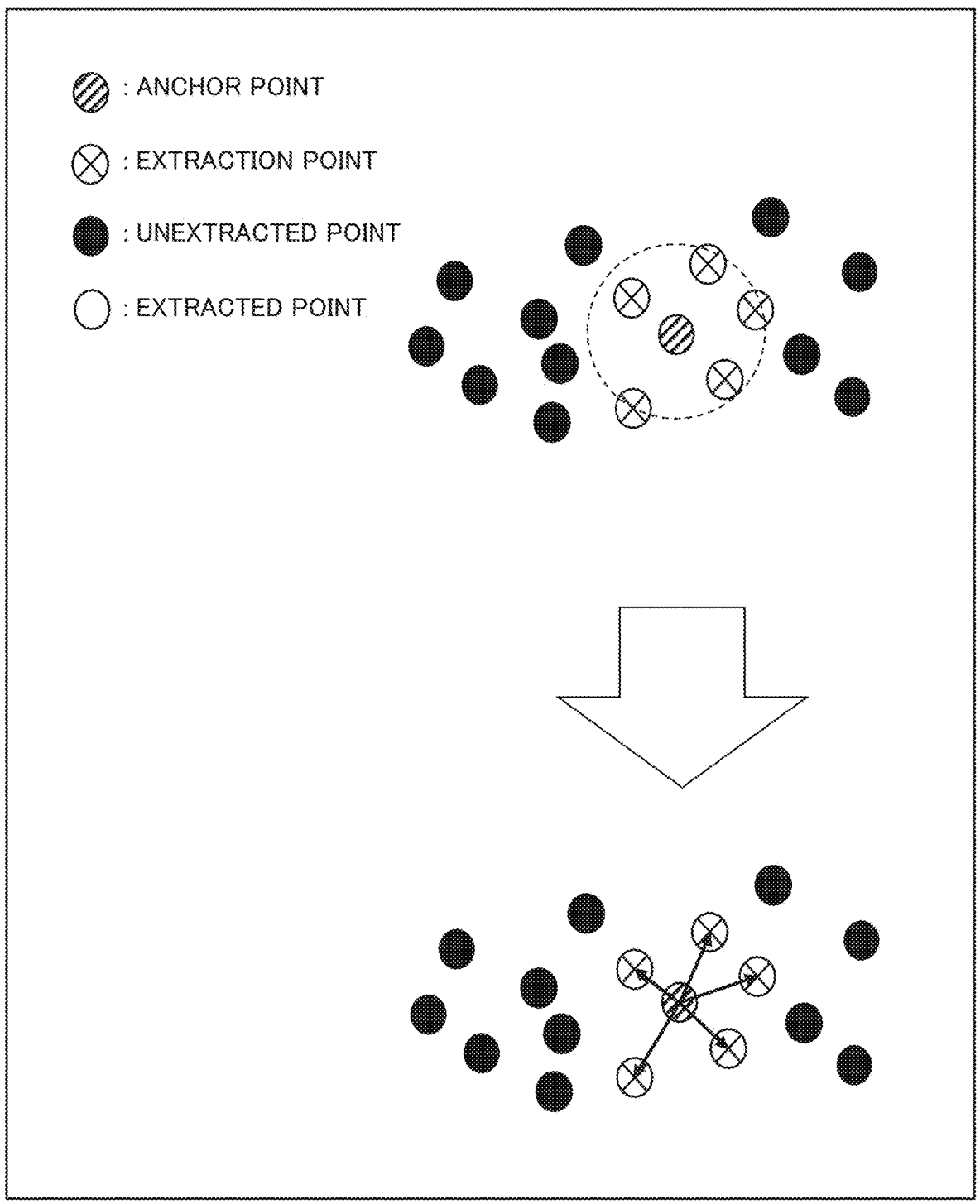
FIG. 2 is an explanatory diagram illustrating an example of a search direction from a first anchor point.

The search direction identification unit 102 will be described in detail with reference to FIGS. 2 and 3. FIG. 2 is an explanatory diagram illustrating an example of a search direction from the first anchor point. FIG. 2 illustrates search directions from the first anchor point to points adjacent to the anchor point. The search direction identification unit 102 sets the anchor point as a start point, sets an adjacent point within a predetermined distance from the start point as an end point, and calculates a search direction to a point adjacent to the anchor point as a center. In FIG. 2, a dashed circle indicates a range within the predetermined distance from the anchor point. In FIG. 2, each arrow indicates a search direction. In FIG. 2, each extraction point is a point within the predetermined distance from the anchor point. In FIG. 2, the number of identified search directions is five. In FIG. 2, since the anchor point is the first anchor point, an extracted point is not present.

Figure 3:
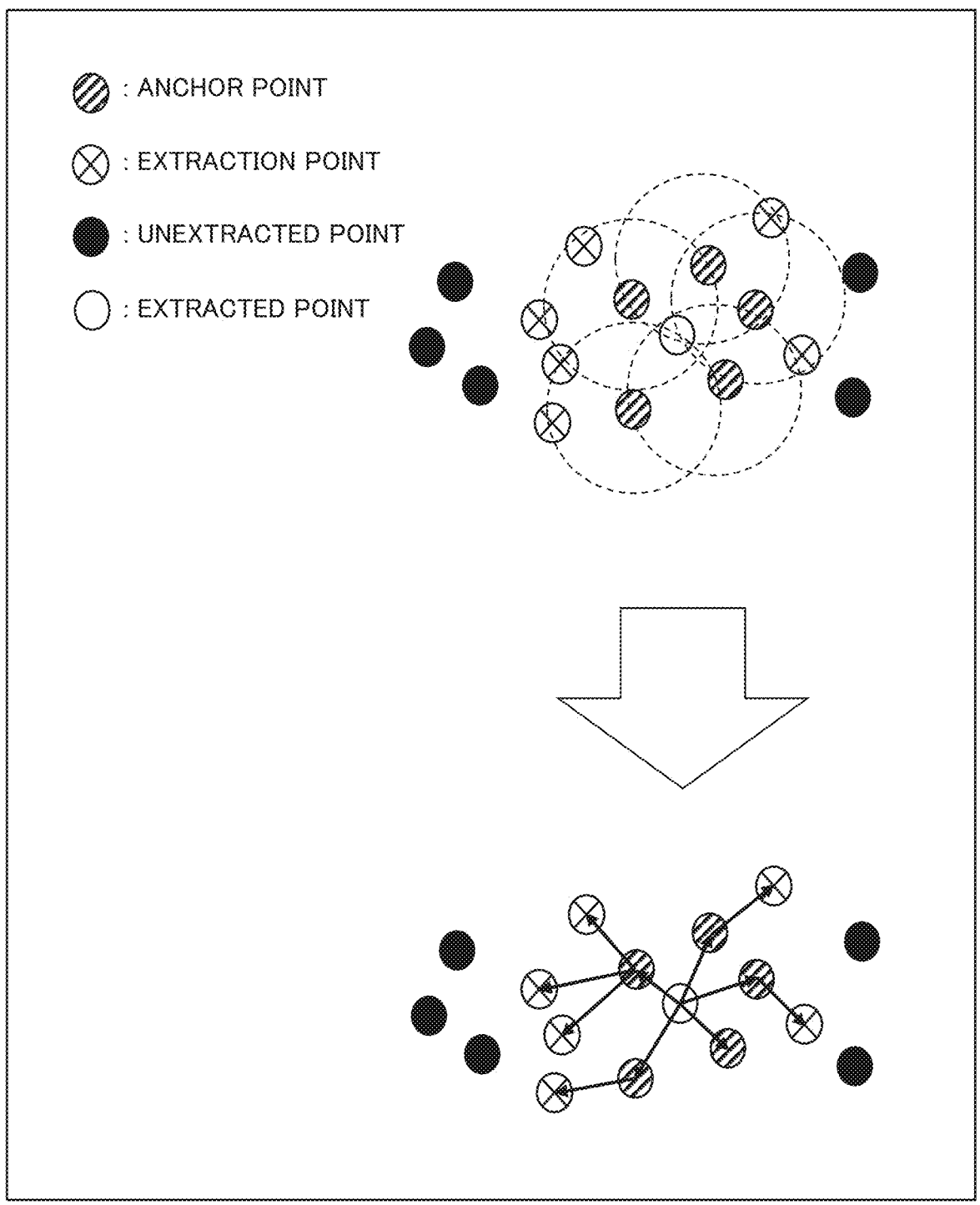
FIG. 3 is an explanatory diagram illustrating an example of a search direction from a next anchor point.

FIG. 3 is an explanatory diagram illustrating an example of a search direction from the next anchor point. FIG. 3 illustrates neighboring points searched at the anchor point as next anchor points, and a search direction from each of the anchor points to a point adjacent to the anchor point. The search direction identification unit 102 shifts the anchor point to an adjacent point by repeating such processing. Then, the search direction identification unit 102 can identify a search direction extending from the first anchor point to the entire region by using the breadth-first search. The object identification unit 101 may assign processing relating to each anchor point to a processor such as a central processing unit (CPU) or a graphic processing unit (GPU) for each anchor point, and perform the processing in parallel.

In FIG. 3, each dashed circle indicates a range within a predetermined distance from a new anchor point. The object identification unit 101 sets, as neighboring points, points other than the point already selected as the anchor point among points within the predetermined distance from the anchor point. In FIG. 3, the first anchor point is represented as an extracted point. In FIG. 3, the total number of identified search directions is 11.

Figure 4:
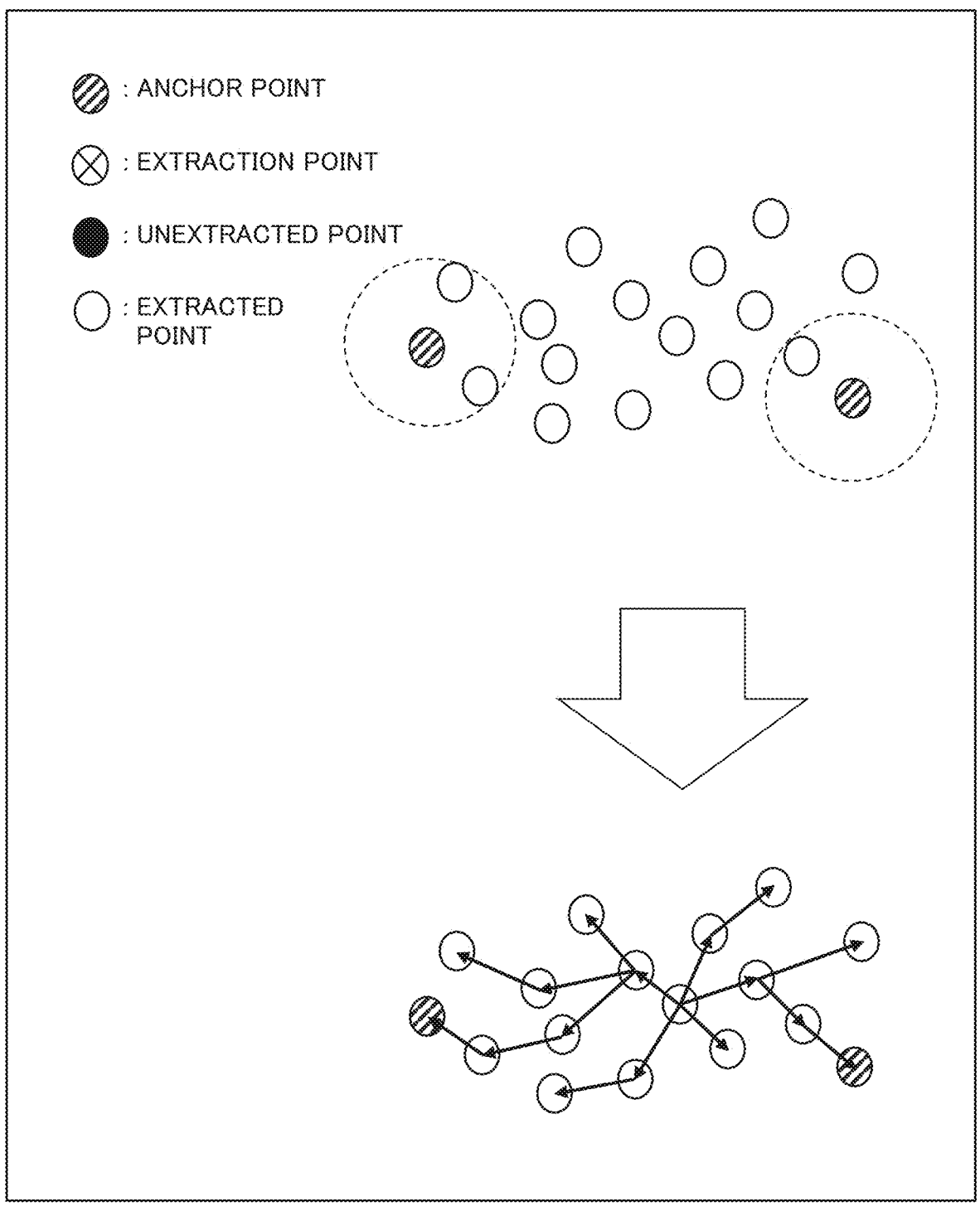
FIG. 4 is an explanatory diagram illustrating an example in which a search is ended.

FIG. 4 is an explanatory diagram illustrating an example in which the search is ended. FIG. 4 illustrates that the search is ended at all points. In FIG. 4, the total number of identified search directions is 16.

Next, an example in which the search direction identification unit 102 identifies a search direction using image data indicating the region of the object will be described. For example, the search direction identification unit 102 sets, in color information similar to (alternatively, matching) each pixel of an image or in a region in a contour obtained from contour extraction, a pixel in the region as an anchor point. Then, the search direction identification unit 102 may calculate a search direction from a pixel close to the set anchor point. The first anchor point may be specified by the user, as described above. The first anchor point may also be a pixel at the center of the region within the contour. Specifically, for example, the search direction identification unit 102 identifies a pixel within a range within the predetermined distance from a pixel that is an anchor point. The predetermined distance is as described above. Then, for example, the search direction identification unit 102 sets the anchor point as a start point and sets the identified pixel as an end point. Then, the search direction identification unit 102 identifies the direction from the start point to the end point as the search direction.

Next, the unknown region determination unit 103 will be described. The unknown region determination unit 103 receives the search direction obtained from the search direction identification unit 102 as an input. The unknown region determination unit 103 determines whether the search direction identified by the search direction identification unit 102 satisfies criteria indicating that information relating to the object is missing. For example, the unknown region determination unit 103 determines whether the search direction satisfies the criteria indicating that information relating to the object is missing, based on each search direction and information indicating the region of the object. As described later, the criteria are that a predetermined number or more of points are not present near an end point of a search direction. Alternatively, the criteria are that, in a case where an end point of a search direction is set as an anchor point, a predetermined number or more of new search directions are not present. As a result, for example, the unknown region determination unit 103 estimates, from the search direction, missing of information due to the object obstructed or outside the angle of view, or the imaging position of the imaging device. An example of the estimation method will be described with reference to FIGS. 5 and 6. A missing portion of the object is also referred to as an unknown region. A search direction satisfying the criteria is also referred to as a search direction indicating an unknown region.

Figure 5:
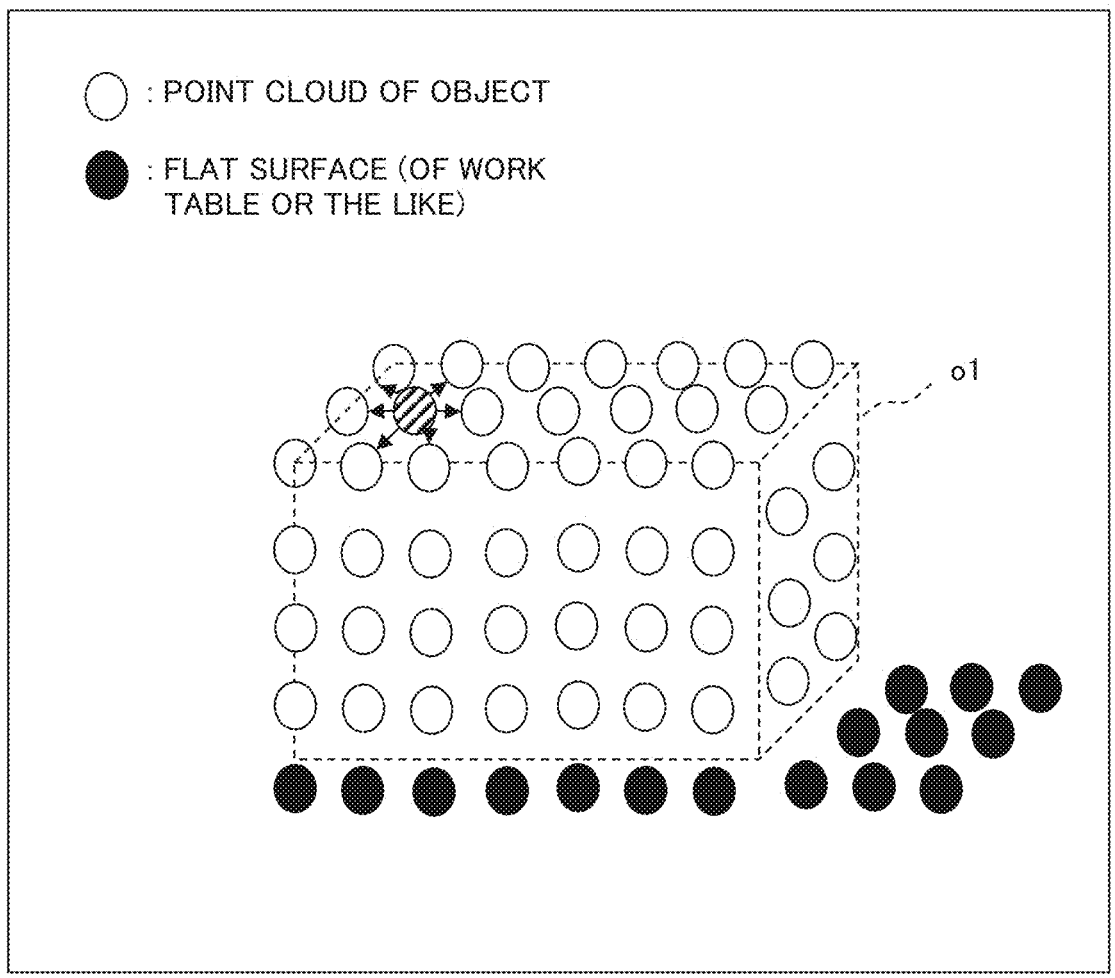
Figure 6:
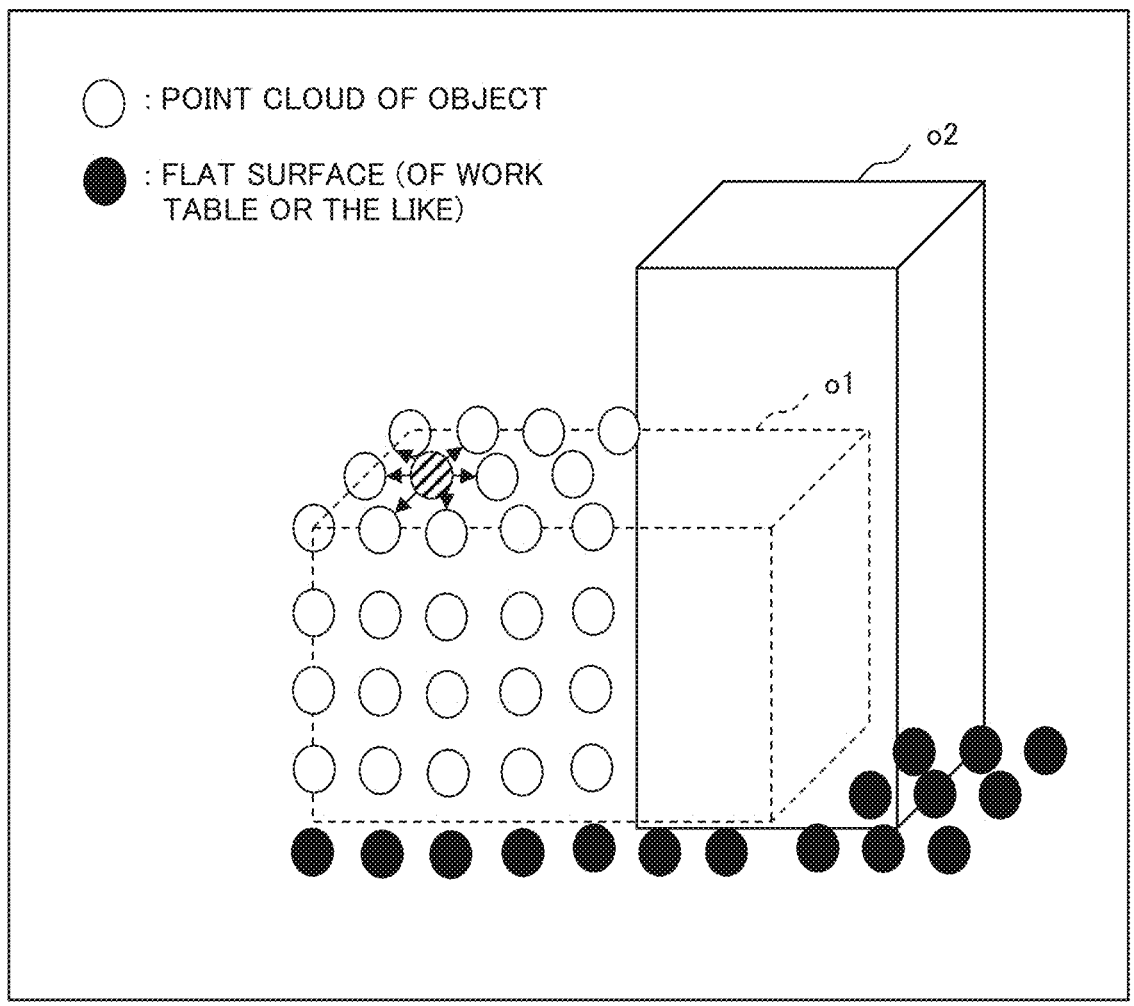
FIG. 6 is a diagram illustrating a situation in which a portion of the three-dimensional point cloud data of the object is missing due to obstructing by another object.

FIG. 5 is a diagram illustrating three-dimensional point cloud data of an object that is not obstructed or the like. FIG. 6 is a diagram illustrating a situation in which a part of the three-dimensional point cloud data of the object is missing due to obstructing by another object. The object o1 indicated by a broken line in FIGS. 5 and 6 is a target of which an image is to be captured.

As illustrated in FIG. 5, in the case of no obstructing, as indicated by a point cloud, all information of each surface of the object o1 is present.

On the other hand, as illustrated in FIG. 6, since the object o1 is obstructed by the object o2, information of a certain surface of the object o1, for example, information of a side surface, is missing. Therefore, a boundary line is generated between the region of the object and a region in which the information of the object is missing.

Specifically, for example, the unknown region determination unit 103 identifies a search direction that satisfies the criteria from a search direction around the boundary as a search direction indicating the unknown region. The identified search direction indicating the unknown region is, for example, a candidate for the missing portion of the object. For example, in the case of a three-dimensional point cloud, when information of a point represented by (x, y, z) is not present at a destination in the same direction as an identified search direction to the anchor point set as an end point, the unknown region determination unit 103 counts the number of points within a radius r from the certain anchor point. A search direction to an anchor point set as an end point is also referred to as a search direction immediately before a certain anchor point. The destination in the same direction as the search direction is an extension of the search direction. For example, when a point is not present on an extension of a search direction immediately before a certain anchor point, the unknown region determination unit 103 counts the number of points within the radius r from the certain anchor point. The same direction may be substantially the same direction. Whether the direction is substantially the same as the direction is determined, for example, based on whether the angle formed by the two directions satisfies a criterion for determining that the directions are the same. For example, the criterion is that the angle is equal to or less than a predetermined angle such as 3 degrees or less, 5 degrees or less, or 10 degrees or less. Similarly, the extension is not limited to the same straight line, and may be a line (hereinafter, such a line is also referred to as an "extended line") that satisfies the above criterion. Hereinafter, for convenience of description, the same direction and substantially the same direction are collectively referred to as "the same direction".

Figure 7A:
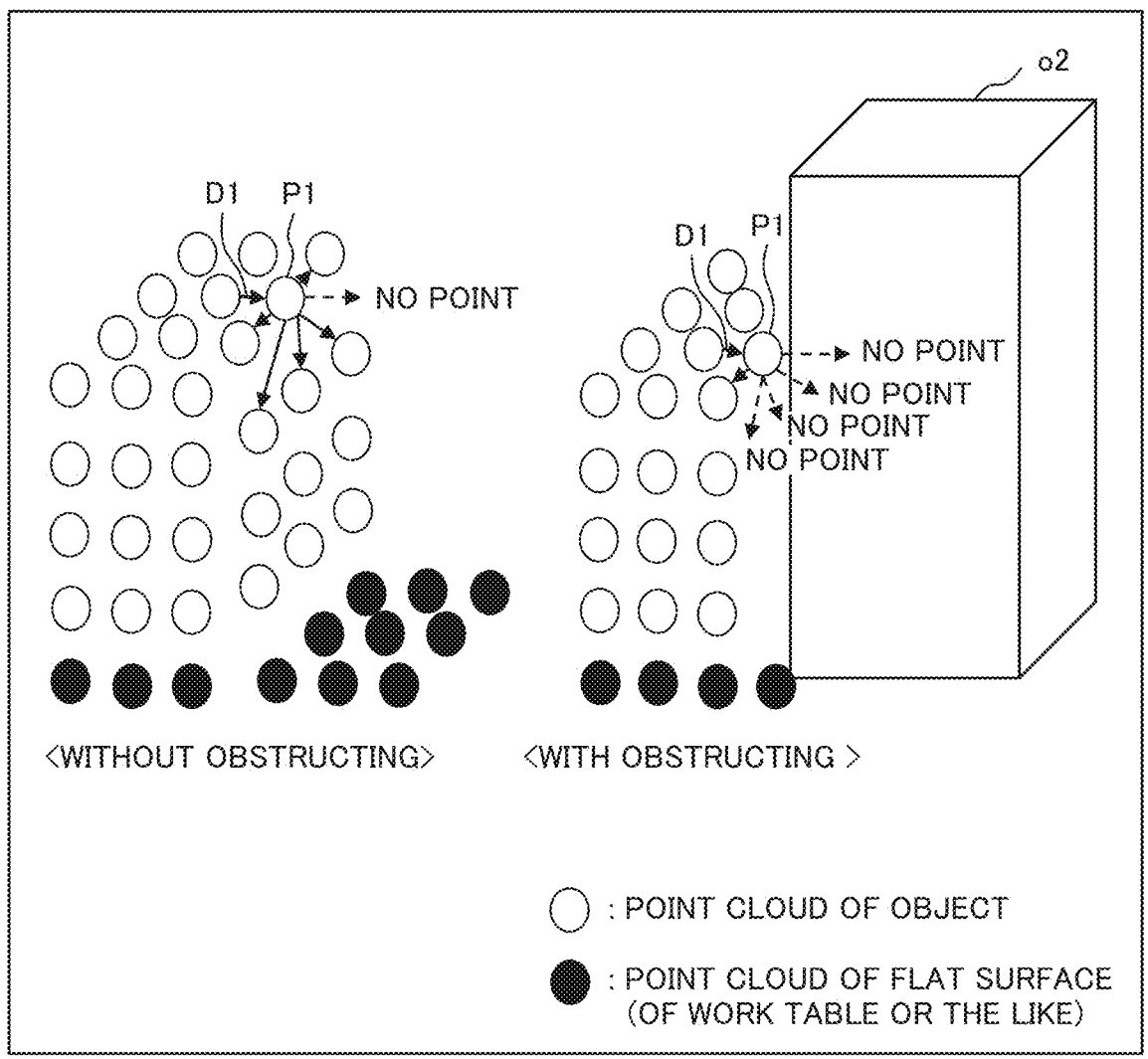
FIG. 7A is an explanatory diagram illustrating a search direction from a certain point.
Figure 7B:
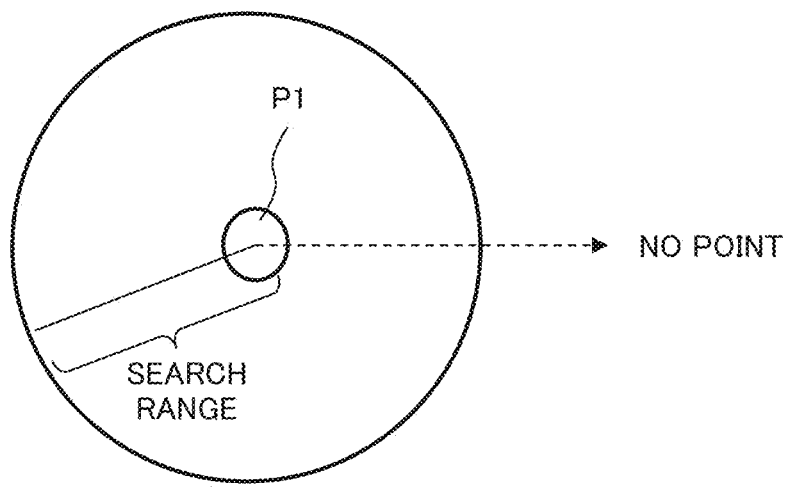
FIG. 7B is an explanatory diagram illustrating a region for counting the number of points within a radius r from the certain point.

FIG. 7A is an explanatory diagram illustrating a search direction from a certain point. FIG. 7B is an explanatory diagram illustrating a region for counting the number of points within the radius r from the certain point. For example, in FIG. 7, a description will be given using a point P1 which is an end point of a search direction D1. A point other than the point P1 is not present on an extension in the same direction as the search direction D1. Therefore, the unknown region determination unit 103 counts the number of points within the radius r from the point P1. As illustrated in FIG. 7, the number of points within the radius r from the point P1 in the case without obstructing is larger than the number of points within the radius r from the point P1 in the case with obstructing.

Therefore, the criteria indicating that information relating to the object is missing may be that the number of points around the end point of the search direction does not satisfy a predetermined number. For example, when the number of points around the end point of the search direction is not equal to or larger than the predetermined number, the unknown region determination unit 103 identifies the search direction as a search direction indicating an unknown region. That is, for example, when the number of points around a certain anchor point is not equal to or larger than the predetermined number, the unknown region determination unit 103 identifies a search direction immediately before the certain anchor point as a search direction indicating an unknown region. The predetermined number (threshold value) may be determined by the user. The predetermined number (threshold value) may be set based on the resolving power of each sensor included in the sensor unit 11 or the point cloud constituting the object. For example, in the case of the point P1, the unknown region determination unit 103 identifies the search direction D1 as a search direction indicating an unknown region.

The present invention is not limited to the example using the data of the three-dimensional point cloud indicating the region of the object, and the unknown region determination unit 103 may identify an unknown region using two-dimensional image data indicating the region of the object. The user specifies the size of a bounding box or the like indicating the region of the object. In this case, the bounding box is, for example, a quadrangular frame. Then, in the case of the image data, the unknown region determination unit 103 may set a bounding box having a specified size, and in a case where the region of the object identified by the object identification unit 101 does not sufficiently satisfy the set size of the bounding box, the unknown region determination unit 103 may determine that it is affected by obstruction, the outside of the angle of view, or the like. Specifically, for example, in the case of the image data, in a case where the size of the region of the object identified by the object identification unit 101 is smaller than the size specified by the user by a predetermined size or more, the unknown region determination unit 103 determines that the object is hidden due to obstructing, the outside the angle of view, or the like in the image. When determining that a part of the obstructing is missing, the unknown region determination unit 103 may identify the unknown region from the boundary line between the region of the object that is being obstructed and the object that obstructs the object. In a case where a portion of the object is missing because the part of the object is outside the angle of view, the unknown region determination unit 103 may identify the unknown region from the region of the object, the part outside the angle of view, and the boundary line.

A method of determining obstructing and the outside of the angle of view will be described. For example, in a case where the bounding box is at an edge of the image, the unknown region determination unit 103 determines that a part of the object is outside the angle of view. In a case where the bounding box is not at the edge of the image, the unknown region determination unit 103 determines that a part of the object is hidden due to obstructing. The edge of the image will be described. In a case where the image is a quadrangle, the edge of the image is, for example, a pixel group representing each of four sides of the image. The pixel group representing each of the four sides will be described by exemplifying a case where the size of the image is 640 pixels in the width direction and 480 pixels in the height. The width direction is defined as a column, and a pixel group in the first column is defined as a pixel group on the leftmost side in the image. The height direction is defined as a row, and the first row is defined as a pixel group at the top in the image. A pixel group from the first row to the 480th row in the first column is the left side in the image. A pixel group from the first row to the 480th row in the 640th column is the right side in the image. A pixel group from the first column to the 640th column in the first row is the upper side in the image. A pixel group from the first column to the 640th column in the 480th row is the lower side in the image. The unknown region determination unit 103 determines that a part of the object is outside the angle of view when the edge of the bounding box is at the edge of the captured image. When the bounding box is a quadrangle, the edge of the bounding box is four sides of the bounding box.

In a case where directions indicating an unknown region are output by an output unit (not illustrated) to be described later or the like, when the number of directions within a predetermined range is large, there is a case where it is difficult for the user to see the directions or the like. Therefore, in a case where a predetermined number or more of directions indicating the unknown region are present within a predetermined range, the unknown region determination unit 103 may identify some of the directions present within the range as a direction indicating the unknown region. The predetermined number is not particularly limited. The predetermined number may be specified by the user. A method of setting the range is not particularly limited. The range may be specified by the user. The range may be, for example, within the radius r from the center of a start point in the direction indicating the unknown region. The center of the start points in the direction indicating the unknown region is a center position of each start point in the plurality of directions indicating the unknown region. For example, the unknown region determination unit 103 may identify a start point in a direction indicating an unknown region within a range within the radius r from the center of the start point as a direction indicating an unknown region within the same range. For example, in a case where a predetermined number or more of directions indicating an estimated unknown region are present within the predetermined range, the unknown region determination unit 103 may identify a statistical direction of each direction present within the range as a direction indicating the unknown region. Examples of the statistical direction include an average direction in each direction. The statistical direction may be, for example, a most frequent direction or a direction obtained by a weighted average in each direction. As described above, the direction indicating the unknown region is not limited to the above-described example. In this way, in a case where the number of directions indicating the unknown region is narrowed down, when a direction indicating the unknown region is output, for example, when the direction is displayed, the user can easily see the unknown region, and can easily grasp the unknown region.

Alternatively, in a case where the start point of each direction indicating the unknown region is present within the radius r from the center of the start points of the directions indicating the unknown region (in a case where the start point is present within the predetermined range), the unknown region determination unit 103 sets the start point within the radius r as the next start point. Next, in a case where a start point within the radius r from the next start point is present, the unknown region determination unit 103 recursively expands the range of the start point. Then, the unknown region determination unit 103 may identify the continuous points as a range indicating the unknown region.

Alternatively, in a case where directions indicating respective unknown regions are within a certain angular range, and the start points indicating the directions are close to each other, the unknown region determination unit 103 may set them as the same range. The angular range may be specified by the user. The user may specify a distance and a radius for determining whether the start points are close to each other.

<Operation Example of Unknown Region Identifying Device>

Figure 8:
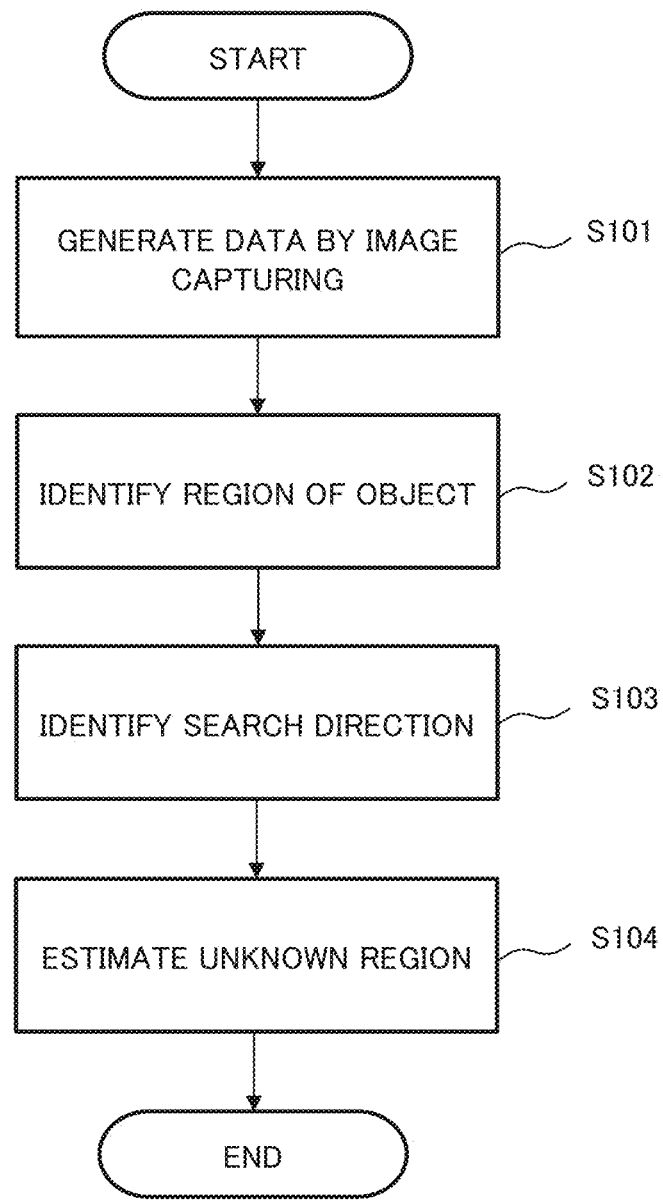
FIG. 8 is a flowchart illustrating an operation example of the unknown region identifying device according to the first example embodiment.

Next, an operation example of the unknown region identifying device 10 will be described. First, the overall operation of the unknown region identifying device 10 will be described with reference to FIG. 8. FIG. 8 is a flowchart illustrating the operation example of the unknown region identifying device 10 according to the first example embodiment.

The sensor unit 11 captures an image of an object on the work table, an image of an object around the work table, or the like, and generates image data or position data (for example, three-dimensional point cloud data) (step S101). As described above, the three-dimensional point cloud data is, for example, RGB-D data or depth data.

The object identification unit 101 identifies a region of the object using the data acquired from the sensor unit 11 (step S102). In step S102, specifically, for example, the object identification unit 101 identifies information different from information indicating the target object from the acquired data. The different information represents, for example, the ground, a wall, the work table, or the like. More specifically, the object identification unit 101 identifies information of the work table from the acquired data, for example, by plane detection or the like. Then, the object identification unit 101 extracts a point cloud representing the object based on a distance between a certain reference point (anchor point) and a point adjacent to the anchor point from the data identifying the information of the object. The object identification unit 101 identifies a range represented by the extracted point cloud as the region of the object. At this time, the object identification unit 101 sets the point adjacent to the certain reference anchor point as a next reference anchor point. In this manner, the object identification unit 101 extracts the point cloud representing the object by newly setting anchor points.

Then, the object identification unit 101 searches for a point cloud representing the object based on the distance between the anchor point and the adjacent point. Therefore, the search direction identification unit 102 sets the anchor point as a start point and sets the adjacent point as an end point. The search direction identification unit 102 identifies a search direction by connecting the start point and the end point (step S103). The search direction is, for example, a direction from the start point to the end point. Then, the search direction may have information of a length from the start point to the end point.

The unknown region determination unit 103 estimates a search direction indicating an unknown region (step S104).

For example, in step S104, the unknown region determination unit 103 determines whether the search direction identified by the search direction identification unit 102 satisfies the criteria indicating that information relating to the object is missing. Then, the unknown region determination unit 103 identifies a search direction that satisfies the criteria as a search direction indicating an unknown region. More specifically, in step S104, the unknown region determination unit 103 estimates missing of information of the object due to obstructing or the like, for example, missing of information of a side surface of the object from a search direction to a certain anchor point set as an end point by using the search direction obtained by the search direction identification unit 102. Specifically, for example, in a case where the number of points within the radius r from the anchor point is less than the predetermined number (threshold value), the unknown region determination unit 103 identifies a search direction to the anchor point as an end point as a search direction indicating an unknown region. The predetermined number may be specified by the user as described above.

As described later in modifications, an output unit (not illustrated) may output a search direction indicating an unknown region. For example, the output unit (not illustrated) may output a direction indicating an unknown region to the user by overlaying the search direction indicating the unknown region on the captured data.

As described above, in the first example embodiment, the unknown region identifying device 10 identifies the region of the object from the data obtained by the image capturing by the imaging device, and identifies the direction indicating the unknown region among directions extending from inside to outside of the region of the object. As a result, the unknown region identifying device 10 can estimate a portion of the object in which information is missing in the data. As described above, for example, even in a case where information of a three-dimensional model of an object, image data of the object, and the like are not used except for the imaged data, the unknown region identifying device 10 can estimate a portion of the object in which information is missing.

The first example embodiment is not limited to the example described above, and various modifications can be made. As described above, the case where each functional unit in the first example embodiment 1 is implemented by the one unknown region identifying device 10 has been described as an example. Each functional unit in the first example embodiment may be implemented by a plurality of devices, like a system. The system may be implemented by different devices for each function or for each piece of data. For example, the sensor unit 11 and the processing unit 12 may be implemented by different devices. In such a case, for example, the device including the sensor unit 11 may be mounted on a mobile object, and the device including the processing unit 12 may be fixedly installed. For example, the sensor unit 11 and the processing unit 12 may be implemented by the same device as in the first example embodiment. Each functional unit of the processing unit 12 may be implemented by one device or may be implemented by different devices. For example, a plurality of sensor units 11 may be provided for each function. In a case where a plurality of sensor units 11 is provided, the sensor units 11 may be provided at different positions.

The unknown region identifying device 10 may have some functional units. The unknown region identifying device 10 may include a functional unit (not illustrated). As described later in the modifications, the unknown region identifying device 10 may include an output unit.

Second Example Embodiment

Next, a second example embodiment will be described. In the second example embodiment, as an example of a determination device and a control device, a case where each functional unit is implemented by one device will be described as an example. In the second example embodiment, this device is referred to as a viewpoint planning device. The unknown region identifying device according to second example embodiment determines a viewpoint for interpolating information indicating an unknown region using a search direction indicating the identified unknown region. The viewpoint is a position at which a sensor unit captures an image. In the second example embodiment, a case where the sensor unit is mounted on a robot arm will be described as an example. For example, in the second example embodiment, processing in the viewpoint planning device will be described with reference to an example in which the robot arm performs each main operation such as gripping an object placed on a work table.

Figure 9:
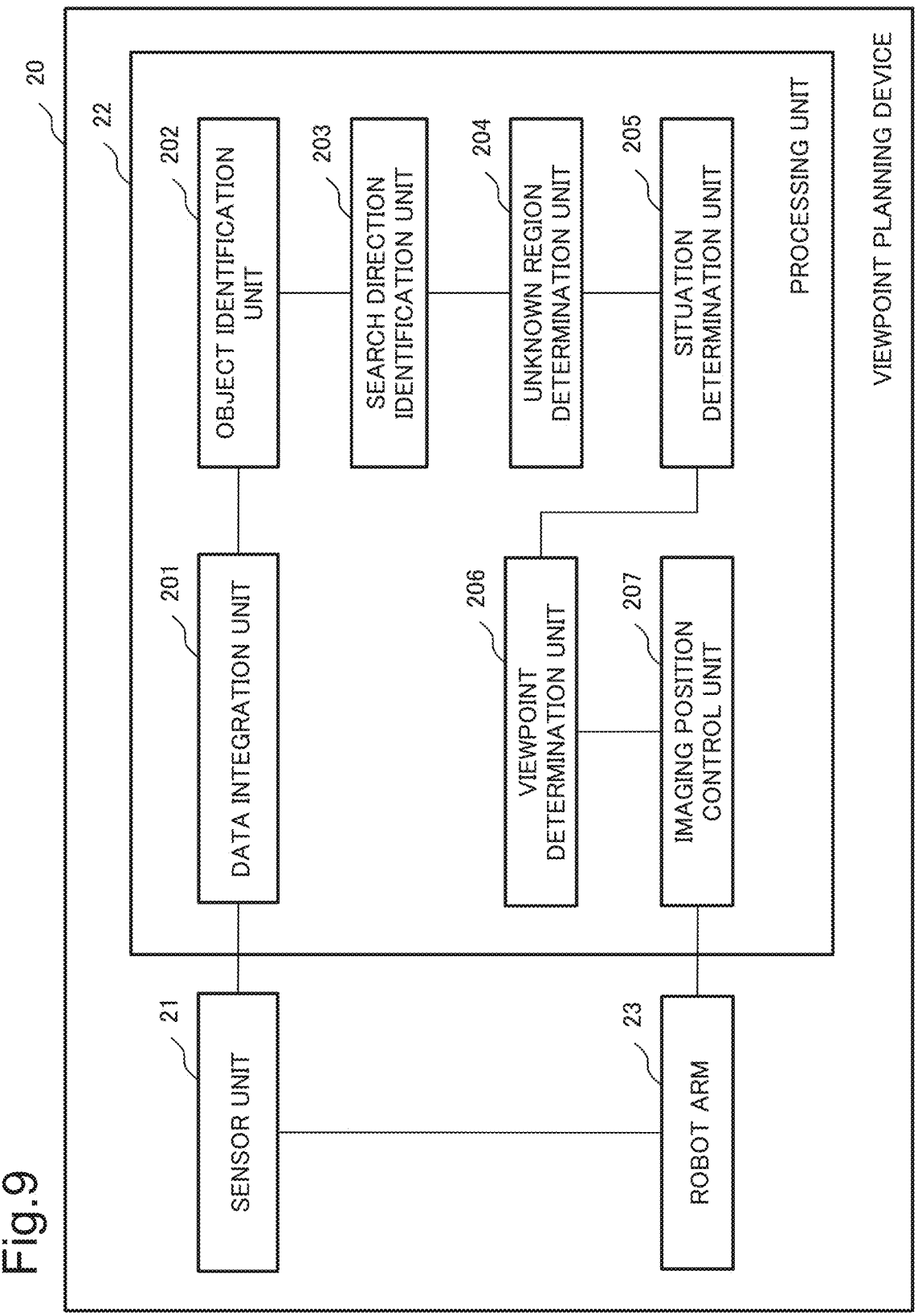
FIG. 9 is a block diagram illustrating a configuration example of a viewpoint planning device according to a second example embodiment.

FIG. 9 is a block diagram illustrating a configuration example of the viewpoint planning device according to the second example embodiment. A viewpoint planning device 20 includes a sensor unit 21, a processing unit 22, and a robot arm 23. A processing result of each functional unit may be stored in, for example, a memory to be described later.

Since the sensor unit 21 is similar to the sensor unit 11 of the first example embodiment, a detailed description thereof will be omitted.

The processing unit 22 derives a direction indicating missing in an object by using image data, RGB-D data, or depth data generated from the sensor unit 21. As described above, the missing in the object in the captured data occurs due to obstructing by another object, the object being out of the imaging range, or the like. Then, the processing unit 22 identifies a viewpoint at which an image of a region present in the derived direction can be captured, and outputs a control value for moving the robot arm 23 with the identified viewpoint as a next viewpoint of the sensor unit 21. The control value is a value for controlling the robot arm 23. Specifically, the control value may be, for example, an angle of the robot arm 23. In the second example embodiment, the control value is a value for controlling the movement of the robot arm 23 in such a way that the imaging position of the sensor unit 21 is located at the identified viewpoint.

The processing unit 22 includes a data integration unit 201, an object identification unit 202, a search direction identification unit 203, an unknown region determination unit 204, a situation determination unit 205, a viewpoint determination unit 206, and an imaging position control unit 207.

The object identification unit 202, the search direction identification unit 203, and the unknown region determination unit 204 have at least some of the functions of the object identification unit 101, the search direction identification unit 102, and the unknown region determination unit 103 according to the first example embodiment, respectively. Since the object identification unit 202, the search direction identification unit 203, and the unknown region determination unit 204 may be similar to those of the first example embodiment, detailed description thereof will be omitted.

The data integration unit 201 receives data generated by the sensor unit 21 as an input. In a case where the sensor unit 21 is mounted on the robot arm 23, the position (viewpoint) of the sensor unit 21 changes according to the operation of the robot arm 23. In a case where the sensor unit 21 performs image capturing a plurality of times in the process of the operation, data at a plurality of positions (viewpoints) is obtained. The data integration unit 201 integrates data obtained by capturing an image at each viewpoint into, for example, one piece of data (hereinafter, the integrated piece of data is referred to as "integrated data"). The data integration unit 201 can generate one piece of integrated data in which missing portions are interpolated by integrating a plurality of pieces of data. More specifically, for example, the data integration unit 201 performs registration (alignment) on a plurality of pieces of data to generate integrated data in which the respective pieces of data are integrated.

The data integration unit 201 may store a plurality of pieces of data obtained from the sensor unit 21 and the integrated data in a memory to be described later.

The object identification unit 202 may receive the integrated data as an input and identify a region of the object using the integrated data. As described above, the object identification unit 202, the search direction identification unit 203, and the unknown region determination unit 204 may be similar to those in the first example embodiment, and thus a detailed description thereof will be omitted.

Next, the situation determination unit 205 receives a direction indicating the unknown region of the object identified by the unknown region determination unit 204 as an input. The situation determination unit 205 determines whether the number of directions indicating the unknown region of the object is equal to or larger than a predetermined number. In a case where a predetermined number or more of directions indicating the unknown region of the object are present, the situation determination unit 205 outputs information obtained from the unknown region determination unit 204 to the viewpoint determination unit 206. The predetermined number may be set as a threshold value by a user.

The viewpoint determination unit 206 determines the position of the sensor unit 21 in such a way that the angle of view of the sensor unit 21 (imaging device) includes the direction indicating the unknown region. As a result, the viewpoint determination unit 206 can determine, for example, a viewpoint at which an image of a missing portion can be captured. For example, in a case where a plurality of directions indicating the unknown region is present, the viewpoint determination unit 206 determines the position of the sensor unit 21 including at least some of the plurality of directions. Specifically, when the situation determination unit 205 determines that the number of directions indicating the unknown region is equal to or larger than the predetermined number, the viewpoint determination unit 206 receives the direction indicating the unknown region of the object identified by the unknown region determination unit 204 as an input. The viewpoint determination unit 206 sets viewpoint candidates in advance. Then, for example, when the sensor unit 21 is moved to each candidate in a virtual space (simulation space), the viewpoint determination unit 206 determines, as the next viewpoint, a viewpoint at which information of the unknown region is included.

For example, when the sensor unit 21 is moved to each candidate in the virtual space (simulation space), the viewpoint determination unit 206 determines, as the next viewpoint, a viewpoint at which the largest amount of information of the unknown region is included. Alternatively, in a case where the area of the unknown region satisfies a predetermined viewpoint criterion, the viewpoint determination unit 206 determines, as the next viewpoint, a viewpoint at which information of the unknown region is included. The predetermined viewpoint criterion is, for example, that a ratio (that is, a coverage) of the area of an unknown region of which an image is captured from a certain viewpoint with respect to the total of the areas of all unknown regions is equal to or more than a predetermined threshold value. Alternatively, the viewpoint determination unit 206 may determine a viewpoint with a higher coverage for a plurality of viewpoints as the next viewpoint.

A method for setting a candidate for a viewpoint that is the basis for selecting a next viewpoint is not particularly limited. For example, the viewpoint determination unit 206 determines the number of divisions of a sphere configured by a triangular mesh having a specified size by using a certain reference point as a center position. The number of divisions is the number of triangles, that is, the number of center points of the triangles. The reference point to be the center position of the sphere is the center of the robot arm 23, the center of the table to which the robot arm 23 is fixed, or the like. The reference point is not limited to the center of the robot arm 23 or the center of the table to which the robot arm 23 is fixed. The radius of the sphere is a reach range of the robot arm 23, a value specified by the user, or the like. The size may be specified by the user or may be a fixed value, and is not particularly limited. Then, for example, the viewpoint determination unit 206 generates a sphere including a triangular mesh. For example, the viewpoint determination unit 206 sets the center position of each triangle as a candidate for the viewpoint. As described above, when the size of the triangle is small, the number of divisions increases, that is, the number of candidates for the viewpoint increases. On the other hand, when the size of the triangle is large, the number of divisions decreases, that is, the number of candidates for the viewpoint decreases. The shape of the mesh is not limited to a triangle, and may be an m-polygon (m is an integer of 4 or more) such as a quadrangle or a hexagon.

For example, the viewpoint determination unit 206 generates a sphere including a three-dimensional point cloud. Then, for example, the viewpoint determination unit 206 may downsample the three-dimensional point cloud representing the sphere, and determine a candidate for the viewpoint from the three-dimensional point cloud after the downsampling.

As candidates for the viewpoint, candidates for the position and candidates for the orientation are present. For example, the candidates for the position are candidates for the viewpoint (the center position of each triangle) described above. The viewpoint determination unit 206 may set candidates for the orientation of the sensor unit 21 from the determined candidates for the position. For example, the viewpoint determination unit 206 may set angles of three axes (roll, pitch, and yaw) for the orientation of the sensor unit 21 as candidates in advance. Alternatively, the present invention is not limited to the example in which candidates for the orientation are set. For example, the viewpoint determination unit 206 may determine the orientation of the sensor unit 21 in such a way that the sensor unit 21 faces the center of the identified object. The candidates may be specified by the user. For example, the user may specify the candidates for the viewpoint in such a way that the candidates are set only in front of the robot arm 23. A method of the specifying is not particularly limited. The user may input the candidates via an input device or the like connected to the unknown region identifying device.

Here, for example, the viewpoint determination unit 206 performs simulation based on the three-dimensional point cloud data generated by the sensor unit 21. More specifically, the viewpoint determination unit 206 moves a modeled imaging device of the sensor unit 21 to each candidate in the virtual space. The virtual space is a space simulated based on the three-dimensional point cloud data generated by the sensor unit 21, model data obtained by modeling the robot arm 23, and model data obtained by modeling the imaging device of the sensor unit 21. An existing technique may be used for the simulation. The actual simulation may be executed by another device. For example, the viewpoint determination unit 206 may instruct each candidate of the sensor unit 21 to another device that performs the simulation, and the another device may perform the actual simulation.

The viewpoint determination unit 206 may set a radius r from the center of the region of the identified object and set a point within the radius r from the center as a candidate for the viewpoint. The radius r is not particularly limited. The radius r is such a length that the sensor unit 21 can capture an image of the entire object or capture an image of a missing portion of information of the object. For example, the radius r may be set by the user from a magnification (for example, 2 times, 3 times, 5 times, etc.) of the size of the object.

The viewpoint determination unit 206 moves the sensor unit 21 to each candidate for the viewpoint on the virtual space. In this case, a candidate list including each candidate is represented as V^i (i=1 to N, and N is an integer of 2 or more). Information for obtaining a point cloud representing an unknown region of which an image has not yet been captured from a candidate i is represented as P (V^i). The viewpoint determination unit 206 determines a viewpoint at which information on the most unknown region can be obtained from each candidate included in the candidate list by the following Equation 1. The larger the value of P (V^i), the higher the possibility of obtaining a point cloud representing an unknown region of which an image has not yet been captured.

$$\text{Next View} = \text{argmax}_{i \in \{0, \ldots, N\}} P(V^i) \qquad \text{[Equation 1]}$$

Then, the viewpoint determination unit 206 sets a candidate that satisfies an equation expressed by Equation 1 as the next viewpoint. The viewpoint determination unit 206 may multiply each object obj_j by a weighting coefficient w when calculating information for obtaining a point cloud representing an unknown region of which an image has not yet been captured from the candidate i in the simulation. j=1 to M, and M is an integer of 2 or more. As a result, the viewpoint determination unit 206 can set an index indicating whether the point cloud representing the unknown region is obtained in the direction indicating the unknown region. P (V^i) at that time is defined by an equation expressed by the following Equation 2.

$$P(V^i) = \sum_{j=1}^{M} w * obj_j \qquad \text{[Equation 2]}$$

The weighting coefficient w may be specified by the user, for example. The weighting coefficient w may have an axis in the search direction, for example, and a start point in the direction may be set to 1.0. Then, a weighting coefficient w that is reduced by a predetermined value (for example, 0.1) every time it becomes away from the start point by a certain standard value, for example, 1.0 [cm] (centimeters) is set.

This is because a point cloud representing an unknown region is less likely to be obtained as the distance from a boundary line between the object and the obstructing increases. The weighting coefficient w is set smaller for a candidate farther from a search direction representing the boundary line.

The viewpoint determination unit 206 may determine the viewpoint of the sensor unit 21 that rotates or moves the robot arm 23 in accordance with the search direction obtained from the unknown region determination unit 204, and output the viewpoint to the imaging position control unit 207. Specifically, for example, in a case where the search direction is the right direction, the viewpoint determination unit 206 determines a viewpoint for moving the robot arm 23 to the right. More specifically, for example, in a case where the search direction is the left direction, the viewpoint determination unit 206 identifies a viewpoint for moving the robot arm 23 to the left, and outputs the viewpoint to the imaging position control unit 207. Alternatively, in the case of obstructing by an object, the viewpoint determination unit 206 may output a viewpoint for moving the sensor unit 21 in such a way as to face the search direction obtained from the unknown region determination unit 204. Specifically, for example, in the case of obstructing by an object, the viewpoint determination unit 206 determines a viewpoint in such a way that the sensor unit 21 is oriented perpendicular to or faces the search direction, and outputs the viewpoint to the imaging position control unit 207.

The imaging position control unit 207 outputs a control value for controlling the robot arm 23 to move the sensor unit 21 attached to the robot arm 23 to the next viewpoint calculated by the viewpoint determination unit 206. Specifically, for example, the imaging position control unit 207 calculates a control value for controlling the robot arm 23 by inverse kinematics in order to move the sensor unit 21 to the next viewpoint.

The robot arm 23 is controlled using the control value obtained from the imaging position control unit 207 to move the sensor unit 21. Then, the sensor unit 21 mounted on the robot arm 23 generates new data by performing image capturing at the viewpoint after the movement. The robot arm 23 may be fixed to the work table or the like, or may not be fixed to the work table or the like. For example, the robot arm 23 may be fixed to an AGV or the like. The device to which the sensor unit 21 is attached is not limited to the robot arm 23. The sensor unit 21 may be attached to an AGV, on a cockpit of an automobile, or the like, or on a hood or the like. Then, the imaging position control unit 207 can move the viewpoint of the sensor unit 21 by moving a vehicle body such as the AGV or the automobile. The sensor unit 21 and an actuator are attached on a cockpit of a construction machine or the like, and the actuator rotates vertically or horizontally, or rotates vertically and horizontally, in such a way that the sensor unit 21 can move the viewpoint by rotating together with the actuator. Then, the sensor unit 21 can generate data captured at a new viewpoint.

<Operation Example of Viewpoint Planning Device 20>

Figure 10:
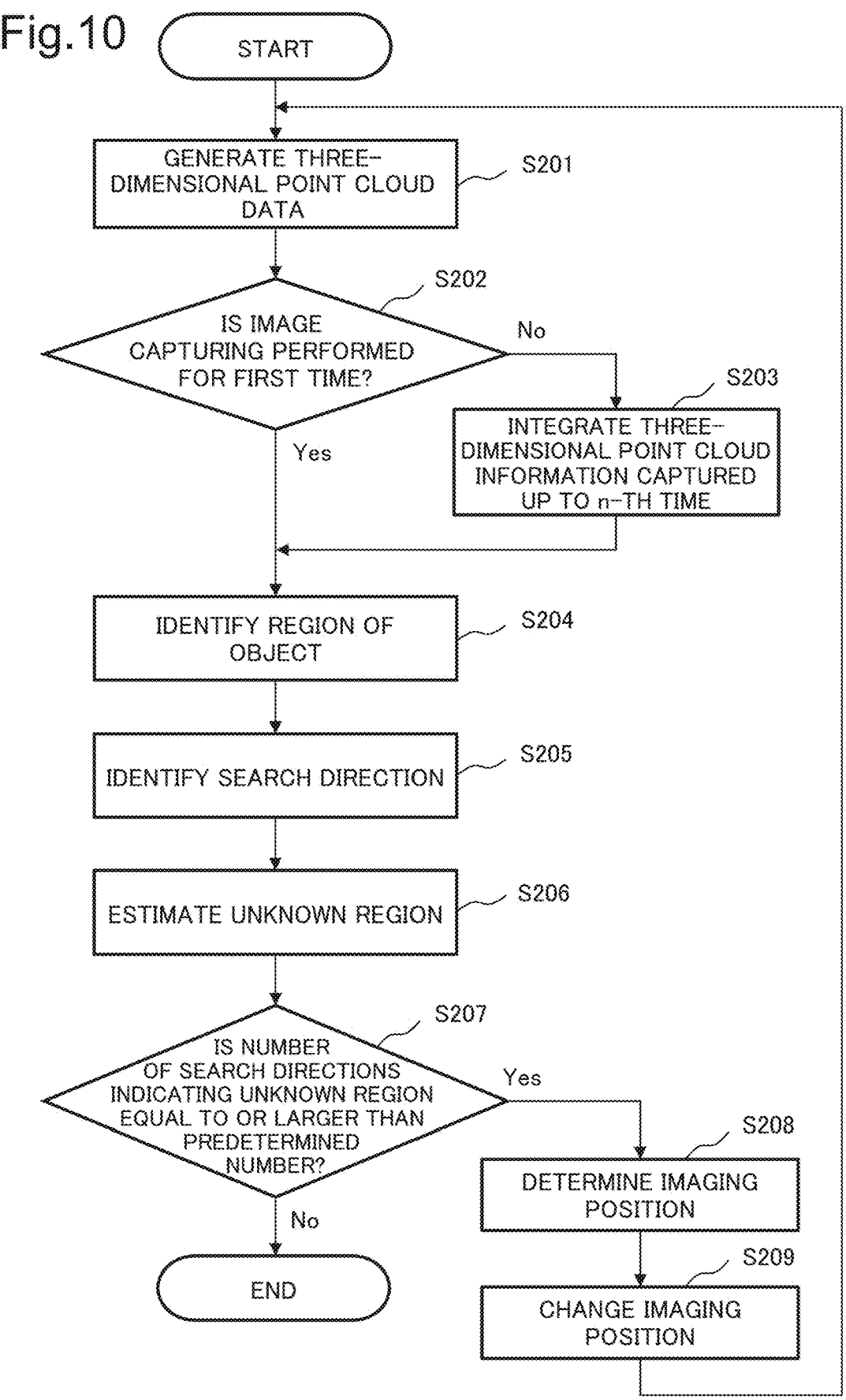
FIG. 10 is a flowchart illustrating an operation example of the viewpoint planning device according to the second example embodiment.

Next, an operation example of the viewpoint planning device 20 according to the second example embodiment will be described with reference to FIG. 10. FIG. 10 is a flowchart illustrating the operation example of the viewpoint planning device 20 according to the second example embodiment. Three-dimensional point cloud data will be described as an example.

The sensor unit 21 generates three-dimensional point cloud data (step S201). In step S201, the sensor unit 21 performs processing similar to that in step S101 of the operation example of the first example embodiment, and thus a detailed description thereof will be omitted.

The data integration unit 201 determines whether image capturing is performed by the sensor unit 21 for the first time (step S202). In a case where the image capturing is performed for the first time in step S202 (step S202: Yes), the data integration unit 201 outputs three-dimensional point cloud data generated by the sensor unit 21 to a memory or the like to be described later.

In a case where the image capturing is performed by the sensor unit 21 for the second or subsequent time, the data integration unit 201 integrates generated data (step S203).

In a case where the image capturing is performed for the first time (step S202: Yes), and after step S203, the object identification unit 202 identifies a region of an object (step S204). Step S204 by the object identification unit 202 is similar to step S102 of the operation example of the first example embodiment, and thus a detailed description thereof will be omitted.

The search direction identification unit 203 identifies a search direction extending from inside to outside of the object (step S205). Step S205 by the search direction identification unit 203 is similar to step S103 of the operation example of the first example embodiment, and thus a detailed description thereof will be omitted.

The unknown region determination unit 204 estimates an unknown region (step S206). Step S206 by the unknown region determination unit 204 is similar to step S104 of the operation example of the first example embodiment, and thus is omitted.

The situation determination unit 205 determines whether the number of directions indicating an unknown region obtained by the unknown region determination unit 204 is equal to or larger than a predetermined number (step S207). In a case where the number of directions indicating the unknown region obtained by the unknown region determination unit 204 is not equal to or larger than the predetermined number (Step S207: No), the viewpoint planning device 20 ends the processing.

In a case where the number of directions indicating the unknown region obtained by the unknown region determination unit 204 is equal to or larger than the predetermined number (step S207: Yes), the viewpoint determination unit 206 determines the imaging position (step S208). In step S208, the viewpoint determination unit 206 sets candidates for the next viewpoint on the virtual space based on the three-dimensional point cloud data and the search directions indicating the unknown region obtained by the unknown region determination unit 204. Then, the viewpoint determination unit 206 determines, for example, a viewpoint for most interpolating the unknown region of the object from the candidates.

The imaging position control unit 207 changes the imaging position of the sensor unit 21 (step S209). In step S209, the robot arm 23 is moved using inverse kinematics in such a way that the sensor unit 21 can capture an image at the viewpoint obtained by the viewpoint determination unit 206. More specifically, for example, in step S209, the imaging position control unit 207 calculates a control value for moving the robot arm 23 by using inverse kinematics in such a way that the sensor unit 21 can capture an image at the viewpoint obtained by the viewpoint determination unit 206, and moves the robot arm 23 based on the calculated control value.

As described above, in the second example embodiment, the viewpoint planning device 20 determines the next viewpoint of the imaging device from a search direction estimated to be near a missing portion of the object. As a result, the viewpoint planning device 20 can support capturing an image of the information of the missing portion with a small number of times of image capturing.

The second example embodiment is not limited to the example described above, and various modifications can be made. The case where each functional unit in the second example embodiment is implemented by the one viewpoint planning device 20 has been described as an example. Each functional unit in the second example embodiment may be implemented by a plurality of devices like a system. The system may be implemented by different devices for each function or for each piece of data. For example, the sensor unit 21 and the processing unit 22 may be implemented by different devices. In such a case, for example, the device including the sensor unit 21 may be mounted on the robot arm 23, and the device including the processing unit 22 may be fixedly installed. For example, the sensor unit 21 and the processing unit 22 may be implemented by the same device. Each functional unit of the processing unit may be implemented by one device or may be implemented by different devices. For example, a plurality of sensor units 21 may be provided for each function. In a case where a plurality of sensor units 21 is provided, the sensor units 21 may be provided at different positions.

The viewpoint planning device 20 may have some functional units. The viewpoint planning device 20 may have a functional unit not illustrated. As will be described later in the modifications and examples, the viewpoint planning device 20 may include an output unit and a reception unit.

Third Example Embodiment

Next, a third example embodiment will be described. In the third example embodiment, a viewpoint for interpolating the most unknown region is identified using a search direction indicating the unknown region, and a robot arm is controlled to capture an image at the identified viewpoint. Then, in the third example embodiment, information indicating an object of which an image is to be captured and information indicating the periphery of the object are sufficiently interpolated by performing image capturing at the identified viewpoint, and then a viewpoint that causes the least obstructing and at which it is possible to capture an image of the object is determined based on the interpolated information. In the third example embodiment, as an example of a determination device and a control device, a case where each functional unit is implemented by one device will be described as an example. In the third example embodiment, this device is referred to as a viewpoint planning device.

Figure 11:
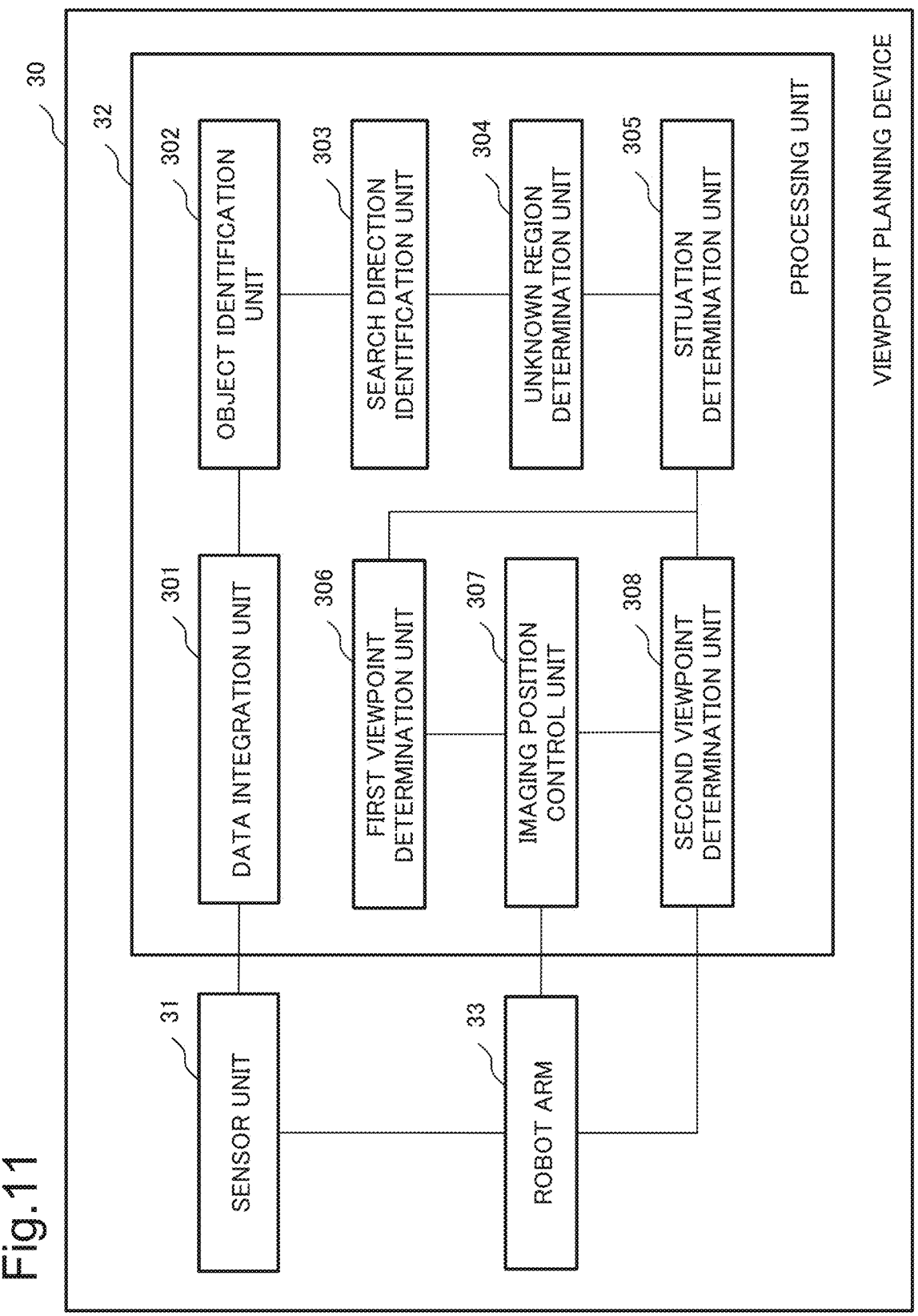
FIG. 11 is a block diagram illustrating a configuration example of a viewpoint planning device according to a third example embodiment.

FIG. 11 is a block diagram illustrating a configuration example of the viewpoint planning device according to the third example embodiment. A viewpoint planning device 30 includes a sensor unit 31, a processing unit 32, and a robot arm 33. A processing result of each functional unit may be stored in, for example, a memory to be described later.

Since the sensor unit 31 is similar to the sensor unit 11 of the first example embodiment, a detailed description thereof will be omitted.

The processing unit 32 derives a search direction indicating missing in an object due to obstructing, the outside of an imaging range, or the like by using image data or position data (for example, RGB-D or depth data) generated from the sensor unit 31. Then, the processing unit 32 determines a viewpoint that most satisfies the unknown region indicated by the derived search direction. The processing unit 32 outputs a control value for controlling the robot arm 33 in order to move the sensor unit 31 to the identified viewpoint. Then, the processing unit 32 determines, from data in which a point cloud representing the unknown region is interpolated by data generated by image capturing at a plurality of viewpoints, a viewpoint at which a missing portion in the region of the object due to the obstructing or the like is minimized or at which information representing the object and the periphery of the object can be obtained most, and outputs the control value for moving to the determined viewpoint.

The processing unit 32 includes a data integration unit 301, an object identification unit 302, a search direction identification unit 303, an unknown region determination unit 304, a situation determination unit 305, a first viewpoint determination unit 306, an imaging position control unit 307, and a second viewpoint determination unit 308. In the third example embodiment, the second viewpoint determination unit 308 is a functional unit newly added from the second example embodiment. For easy understanding, the first viewpoint determination unit 306 and the second viewpoint determination unit 308 are different functional units, but may be one viewpoint determination unit.

The data integration unit 301, the object identification unit 302, the search direction identification unit 303, the unknown region determination unit 304, the situation determination unit 305, the first viewpoint determination unit 306, and the imaging position control unit 307 may be similar to the data integration unit 201, the situation determination unit 205, the viewpoint determination unit 206, and the imaging position control unit 207 in the second example embodiment, and the object identification unit 101, the search direction identification unit 102, and the unknown region determination unit 103 in the first example embodiment, and thus, a detailed description thereof is omitted.

In a case where the direction indicating the identified unknown region satisfies the criteria indicating that information relating to the object is missing, the second viewpoint determination unit 308 determines the position of the sensor unit 31 in such a way that the angle of view of the sensor unit 31 (imaging device) includes the direction. More specifically, for example, the second viewpoint determination unit 308 operates in a case where the situation determination unit 305 determines that the number of search directions indicating the unknown region is not equal to or larger than a predetermined number. The second viewpoint determination unit 308 receives, for example, data output by the data integration unit 301. In a case where the image capturing is performed for the first time, data input to the second viewpoint determination unit 308 is data captured for the first time. In a case where the image capturing is performed for the second or subsequent time, the data input to the second viewpoint determination unit 308 may be integrated data integrated by the data integration unit 301. In a case where the image capturing is performed for the second or subsequent time, the data input to the second viewpoint determination unit 308 may be data selected from a plurality of pieces of data. Alternatively, in a case where the image capturing is performed for the second or subsequent time, the data input to the second viewpoint determination unit 308 may be data obtained by integrating data selected from a plurality of pieces of data by the data integration unit 301.

Then, the second viewpoint determination unit 308 may determine the viewpoint (imaging position) in a simulation. Specifically, for example, the second viewpoint determination unit 308 performs the simulation from the data obtained by the sensor unit 31 and the model of the sensor unit 31 having information of the resolving power and the angle of view of each sensor included in the sensor unit 31. As described in the second example embodiment, the actual simulation may be performed by another device similarly to the first viewpoint determination unit 306. For example, the second viewpoint determination unit 308 may instruct each candidate for the viewpoint of the sensor unit 31 to another device that performs the simulation, and the another device may perform the actual simulation. Then, the second viewpoint determination unit 308 may determine, as the next viewpoint, a viewpoint that causes the least obstructing or the like in a list including the viewpoint candidates set in the simulation, or a viewpoint at which information can be obtained the most. Similarly to the first viewpoint determination unit 306, the second viewpoint determination unit 308 determines candidates for the viewpoint included in the list as follows. For example, the second viewpoint determination unit 308 generates a sphere with the center of a robot, the center of a fixed table, or the like as the center position. As described in the second example embodiment, the radius of the sphere is a reach range of the robot, a value specified by a user, or the like. Then, for example, the second viewpoint determination unit 308 divides the generated sphere into meshes in a triangular lattice, and sets the center position of each triangle as a candidate for the viewpoint. As described above, the shape of each mesh is not limited to a triangle, and may be an m-polygon (m is an integer of 4 or more) such as a quadrangle or a hexagon. A region of a missing portion of the data due to the obstructing may be set by the user according to the size of the object in the simulation. As the viewpoint at which the information on the missing portion is most obtained, for example, the second viewpoint determination unit 308 may determine, as the imaging position, a viewpoint when information of the object having the largest number of point clouds is captured in the simulation. The second viewpoint determination unit 308 may determine, as the imaging position, the viewpoint at the time of capturing information of the object including the largest number of regions specified by the user in the simulation. Here, as the regions specified by the user, a part of the entire space may be specified.

The imaging position control unit 207 outputs a control value for moving the sensor unit 31 attached to the robot to the determined viewpoint. For example, the imaging position control unit 207 calculates a control value for moving the sensor unit 31 attached to the arm tip of the robot arm 33 to the next viewpoint by inverse kinematics. The imaging position control unit 207 controls the sensor unit 31 to move the sensor unit 31 to the determined viewpoint by moving the sensor unit 31 mounted on the robot arm 33 together with the robot arm 33 based on the control value.

The robot arm 33 moves the sensor unit 31 mounted on the robot arm 33 together with the robot arm 33 using the control value obtained from the imaging position control unit 307. Then, the sensor unit 31 generates data by newly capturing an image again. The robot arm 33 is not limited to the example of being fixed to the work table or the like, and may be fixed to an AGV or the like. The sensor unit 31 may be attached to an AGV, on a cockpit of an automobile, or the like, or on a hood or the like. In this case, the sensor unit 31 moves as a vehicle body such as an AGV or an automobile moves. The sensor unit 31 and the actuator may be attached on a cockpit of a construction machine or the like, and the actuator may rotate together with the sensor unit 31 in such a way as to obtain new information by rotating vertically, horizontally, or vertically and horizontally.

<Operation Example of Viewpoint Planning Device 30>

Figure 12:
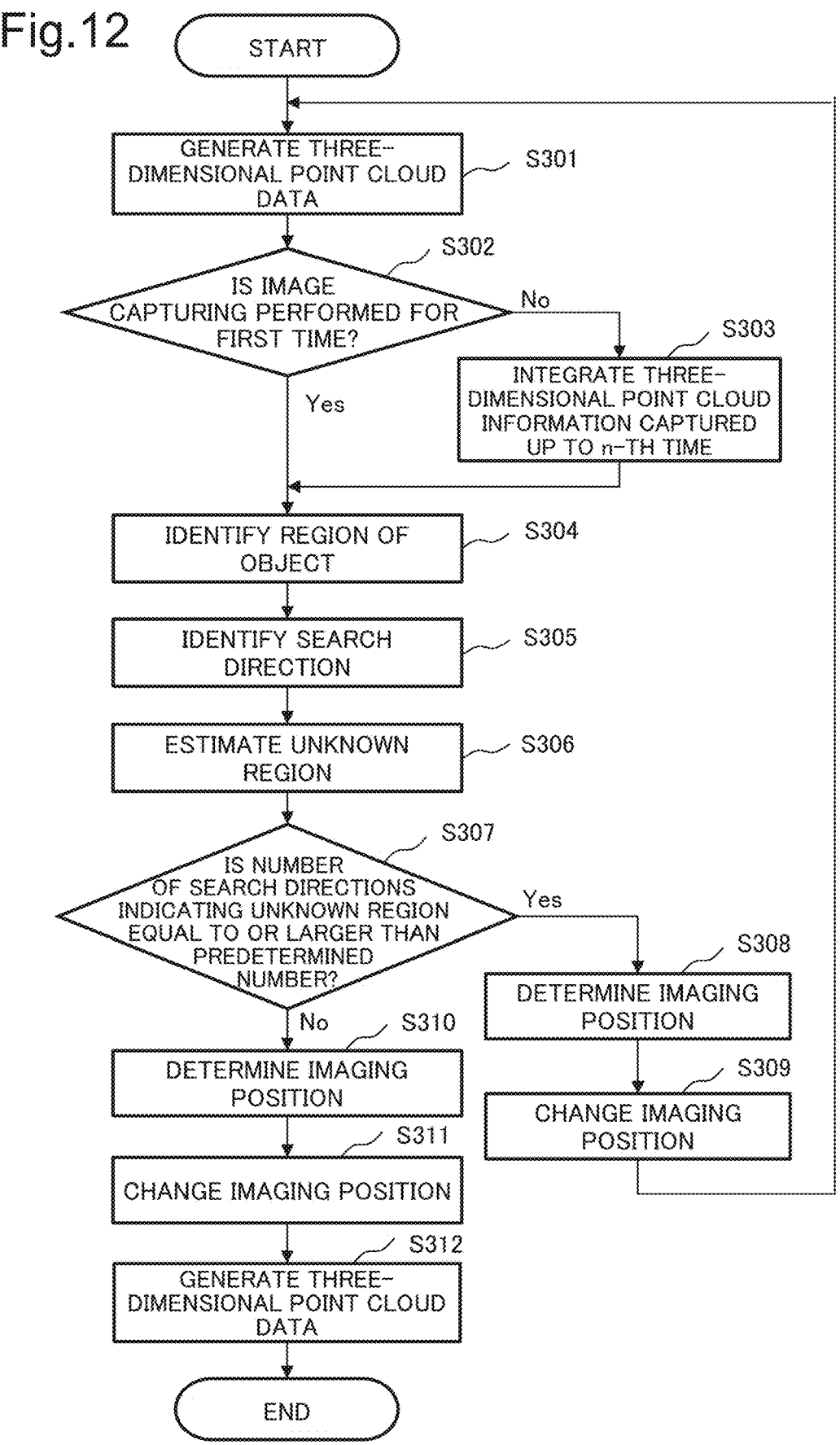
FIG. 12 is a flowchart illustrating an operation example of the viewpoint planning device according to the third example embodiment.

Next, an operation example of the viewpoint planning device 30 according to the third example embodiment will be described with reference to FIG. 12. FIG. 12 is a flowchart illustrating the operation example of the viewpoint planning device according to the third example embodiment.

Steps S301 to S309 illustrated in FIG. 12 may be the same as steps S201 to S209, respectively, and a detailed description thereof will be omitted.

In FIG. 12, processing subsequent to the case where the number of directions indicating the unknown region is not equal to or larger than the predetermined number (step S307: No) is different from the processing subsequent to the case where the number of directions indicating the unknown region is not equal to or larger than the predetermined number as illustrated in FIG. 10 (step S207: No). In FIG. 12, in a case where the number of directions indicating the unknown region is not equal to or larger than the predetermined number (step S307: No), the second viewpoint determination unit 308 determines, as the imaging position, a viewpoint at which a missing portion of the object due to obstructing or the like is minimized from the data input by the situation determination unit 305 (step S310). Alternatively, the second viewpoint determination unit 308 determines the viewpoint at which a point cloud representing the object is most obtained as the imaging position (step S310). Then, the imaging position control unit 307 changes the imaging position (step S311). Specifically, for example, in step S311, the imaging position control unit 307 moves the robot arm 23 using inverse kinematics in such a way that the sensor unit 21 can perform image capturing at the viewpoint determined by the second viewpoint determination unit 308. More specifically, in step S311, the imaging position control unit 307 calculates a control value for moving the robot arm 33 by using inverse kinematics in such a way that the sensor unit 31 can perform image capturing at the viewpoint determined by the second viewpoint determination unit 308, and controls the operation of the robot arm 33 based on the calculated control value. The sensor unit 31 generates three-dimensional point cloud data (step S312). In step S312, the sensor unit 31 generates the three-dimensional point cloud data by newly capturing an image of the target object at the position after the movement. Then, the viewpoint planning device 30 ends the processing.

As described above, in the third example embodiment, the viewpoint planning device 30 determines the next viewpoint of the imaging device from the search direction estimated to be near the missing portion of the object. As a result, the viewpoint planning device 30 can support capturing the information of the missing portion with a small number of times of image capturing.

The third example embodiment is not limited to the example described above, and various modifications can be made. The case where each functional unit in the third example embodiment is implemented by the one viewpoint planning device 30 has been described as an example. Each functional unit in the third example embodiment may be implemented by a plurality of devices like a system. The system may be implemented by different devices for each function or for each piece of data. For example, the sensor unit 31 and the processing unit 32 may be implemented by different devices. In such a case, for example, the device including the sensor unit 31 may be mounted on the robot arm 33, and the device including the processing unit 32 may be fixedly installed. For example, the sensor unit 31 and the processing unit 32 may be implemented by the same device. Each functional unit of the processing unit may be implemented by one device or may be implemented by different devices. For example, a plurality of sensor units 31 may be provided for each function. In a case where a plurality of sensor units 31 is provided, the sensor units 31 may be provided at different positions.

The viewpoint planning device 30 may have some functional units. The viewpoint planning device 30 may have a functional unit not illustrated. As will be described later in the modifications and examples, the viewpoint planning device 30 may include an output unit and a reception unit.

Next, an operation of a mode for carrying out the present disclosure will be described using specific examples. The specific examples are not limited thereto.

Example 1

Example 1 is an example to which the second example embodiment is applied. In Example 1, a viewpoint planning system that provides information indicating a position of a target object and information indicating orientation of the target object for control of picking the target object will be described. The viewpoint planning system described in Example 1 includes, as an example, the viewpoint planning device 20 described in the second example embodiment.

Figure 13:
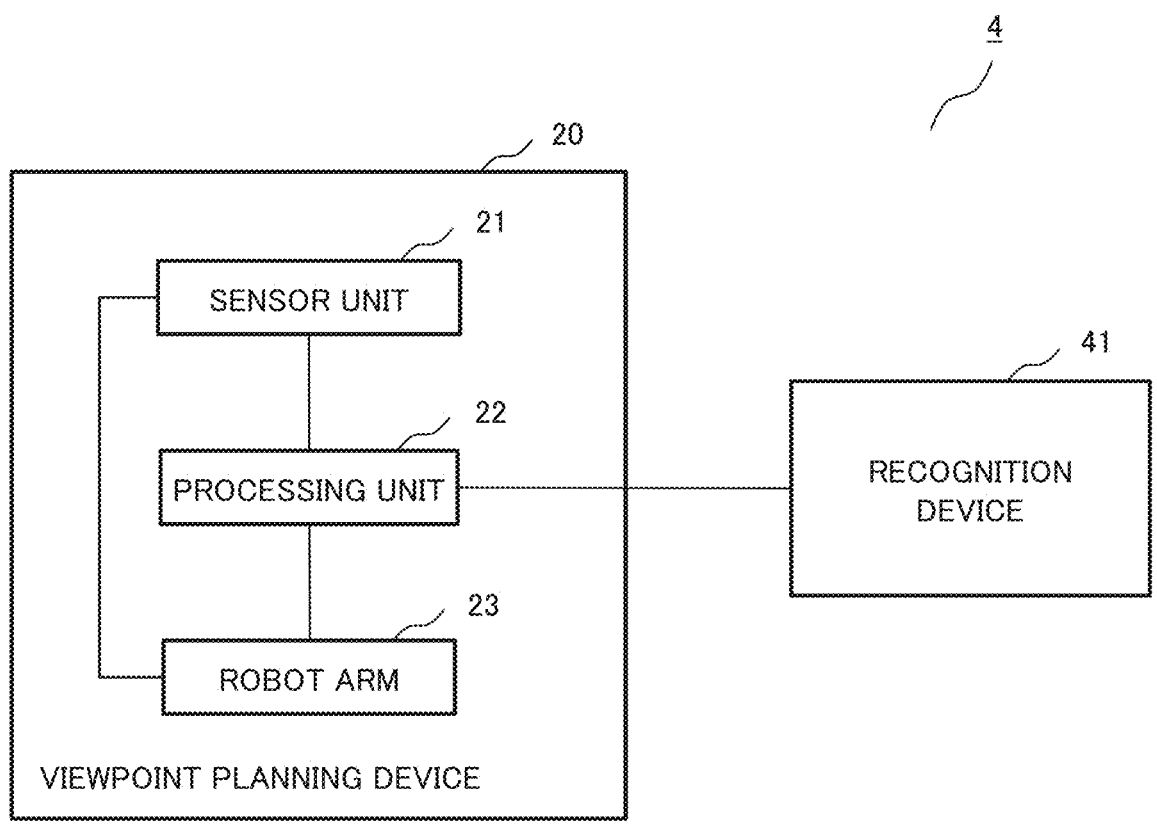
FIG. 13 is a block diagram illustrating a configuration example of a viewpoint planning system according to Example 1.

FIG. 13 is a block diagram illustrating a configuration example of the viewpoint planning system according to Example 1. As illustrated in FIG. 13, a viewpoint planning system 4 includes the viewpoint planning device 20 and a recognition device 41.

Figure 14:
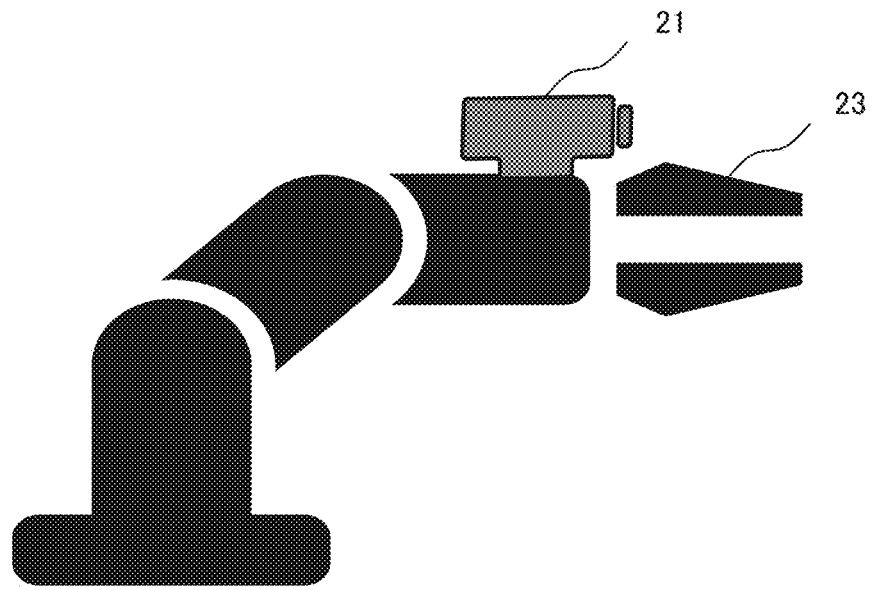
FIG. 14 is an explanatory diagram illustrating an example in which a sensor unit is attached to an arm tip of a robot arm.

FIG. 14 is an explanatory diagram illustrating an example in which the sensor unit 21 is attached to the arm tip of the robot arm 23. As illustrated in FIG. 14, the viewpoint planning device 20 may be a hand-eye camera in which the sensor unit 21 is attached to the arm tip of the robot arm 23. For example, as illustrated in FIG. 14, the sensor unit 21 may be attached in such a way that the optical axis of the sensor unit 21 and the direction of the arm tip of the robot arm 23 are parallel to each other. However, a position and an angle at which the sensor unit 21 is attached are not particularly limited. By using information of the position and angle of the sensor unit 21 attached to the robot arm 23, the robot arm 23 is controlled in such a way that the sensor unit 21 is in the position and direction of the viewpoint.

Figure 15:
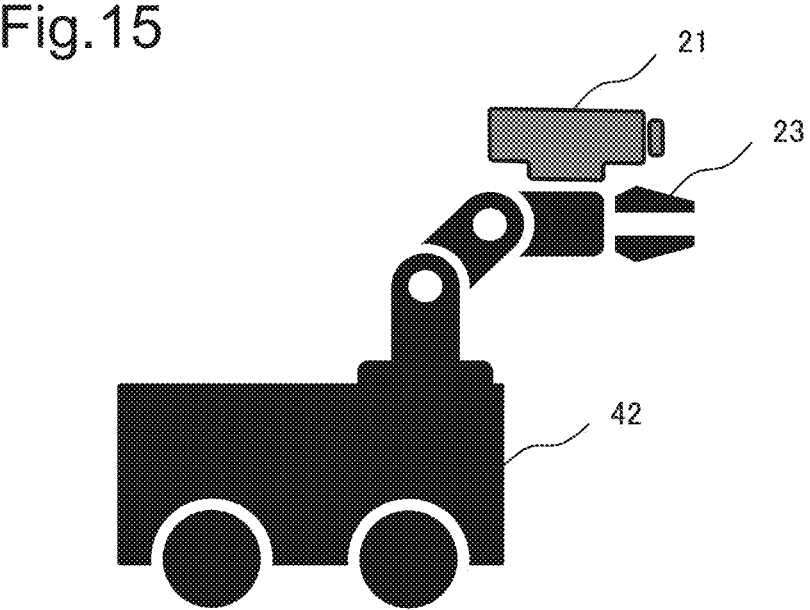
FIG. 15 is an explanatory diagram illustrating an example in which the robot arm and the sensor unit are attached on an AGV.

FIG. 15 is an explanatory diagram illustrating an example in which the robot arm 23 and the sensor unit 21 are attached on an AGV. The work table of the robot arm 23 may be fixed or may not be fixed. For example, the robot arm 23 may be fixed on an AGV 42, and the sensor unit 21 may be mounted on the robot arm 23.

The initial viewpoint to be the initial imaging position of the sensor unit 21 may be determined by the user. Alternatively, the viewpoint planning device 20 may set the initial viewpoint based on some characteristics. For example, the viewpoint planning device 20 may recognize the work table from data generated by the sensor unit 21 and determine the viewpoint in such a way that the work table is included in the imaging range. As a method of recognizing the work table, a method of recognizing a characteristic color of the work table by image color reduction processing, a method of recognizing the work table by characteristic amount matching or machine learning, and a method of model-based matching using three-dimensional model data of the work table may be used.

The viewpoint planning device 20 controls the position of the robot arm 23 with the set initial viewpoint as a start point. Then, in a case where a portion is missing in information of the object in the captured data, the viewpoint planning device 20 may move the robot arm 23 to return to the initial viewpoint again. Then, the viewpoint planning device 20 controls the position of the robot arm 23 in such a way that the viewpoint of the sensor unit 21 becomes the newly identified viewpoint from the initial viewpoint. In this manner, the viewpoint planning device 20 repeatedly controls the operation of the robot arm 23 in such a way that the viewpoint of the sensor unit 21 becomes the identified viewpoint, the viewpoint identified next to the initial viewpoint, and the initial viewpoint starting from the initial viewpoint.

Then, the viewpoint planning device 20 identifies the region of the object using the obtained image data, RGB-D, or depth data. Then, the viewpoint planning device 20 controls the position of the robot arm 23 in such a way as to interpolate a missing region of each object due to obstructing or the outside of the imaging range of each object, based on a search direction indicating an unknown region of the object identified from the region of the object. As a result, the viewpoint planning device 20 acquires data newly generated by the sensor unit 21. In a case where the sensor unit 21 (robot arm 23) is moved a plurality of times, the viewpoint planning device 20 integrates data captured from the respective viewpoints, and transmits the integrated data to the recognition device 41. The integrated data has information in which a region of each object is identified, and an identifier is assigned to each object. Hereinafter, the identifier assigned to the object is also referred to as an object identifier (ID).

The recognition device 41 estimates, for each object ID, the position and orientation of the object by using the information of the object identified for each object ID from the viewpoint planning device 20. For example, as a method of estimating the position, the recognition device 41 may obtain the center or the center of gravity of both objects based on the region of the object. Alternatively, in the recognition device 41, as a method of estimating the position, the user may set a gripping point for the object in advance. Then, the recognition device 41 may use an orientation derivation method by machine learning or model-based matching as a method of estimating the orientation. The recognition device 41 may approximate a primitive shape indicating a cylinder, a rectangular parallelepiped, a sphere, a polyhedron, or the like from the shape of the object, and derive the orientation on based on the primitive shape. The recognition device 41 may generate the primitive shape from the captured data. As a method of estimating the orientation of the generated primitive shape, in the case of a cylinder, for example, the recognition device 41 may determine the central axis of the cylinder as one of three axes (roll, pitch, and yaw) of the orientation. The recognition device 41 may determine the other two axes from the determined one axis in such a way that the mutual axes form an angle of 90 degrees with respect to the vertical direction and the horizontal direction with respect to a surface such as the work table or the ground. In the case of a rectangular parallelepiped, the recognition device 41 may determine, for example, a normal direction of a certain surface as one of the three axes of the orientation. Then, the recognition device 41 may determine the remaining two axes from vertical and horizontal sides of a certain plane in the estimated normal direction, or may determine the two axes from the spread of the distribution of the plane.

Example 2

Example 2 is an example to which the third example embodiment is applied. In Example 2, a viewpoint planning system including the viewpoint planning device 30 described in the third example embodiment will be described. In Example 2, an example in which the user can change the imaging position of the sensor unit 31 determined by the viewpoint planning device 30 will be described.

Figure 16:
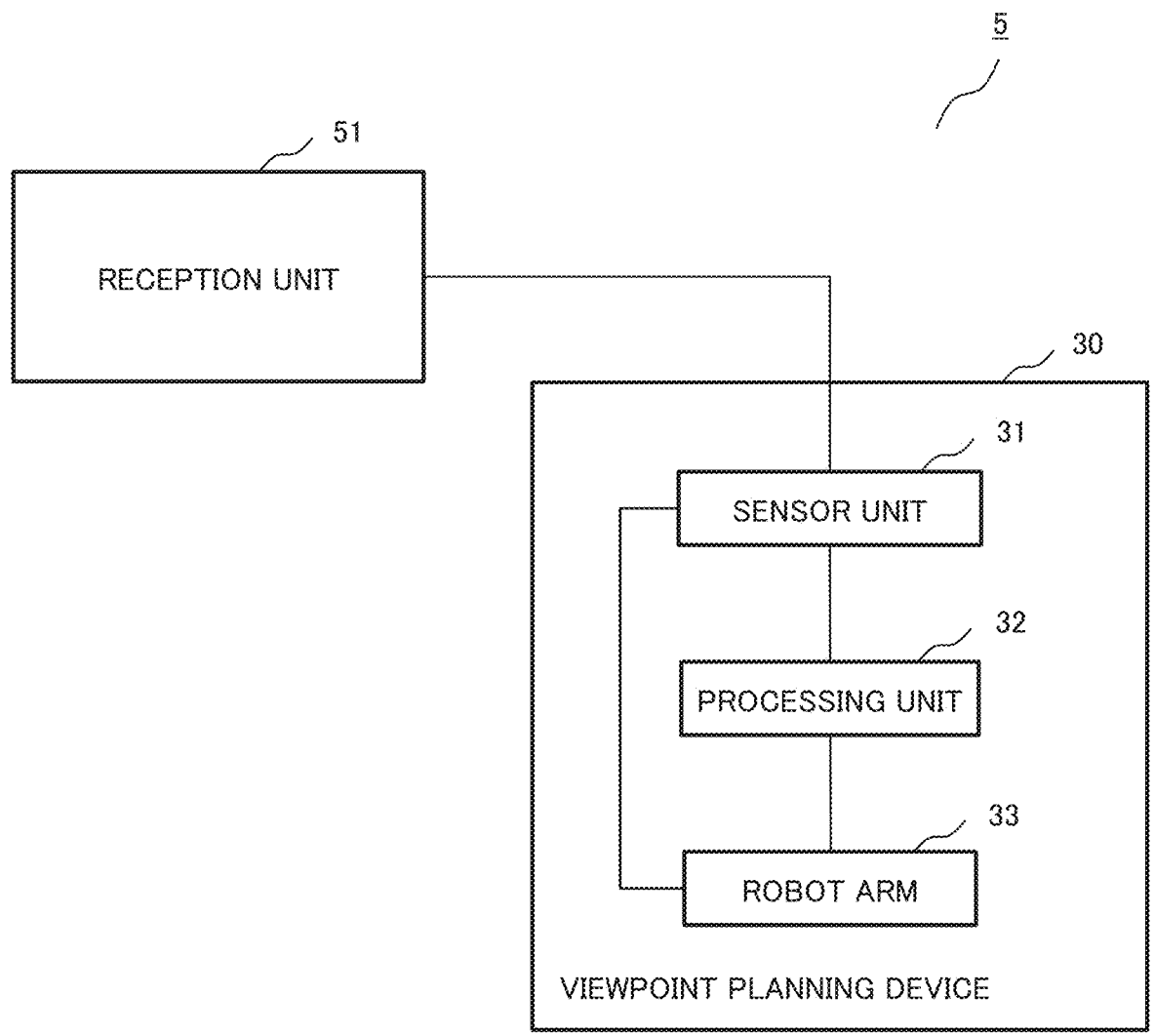
FIG. 16 is an explanatory diagram illustrating an example of a viewpoint planning system according to Example 2.

FIG. 16 is an explanatory diagram illustrating an example of the viewpoint planning system according to Example 2. A viewpoint planning system 5 includes the viewpoint planning device 30 and a reception unit 51.

The viewpoint planning device 30 may be a hand-eye camera in which the sensor unit 31 is attached to the arm tip of the robot arm 33. The sensor unit 31 in the viewpoint planning device 30 may be mounted on a cockpit on an automobile, a construction machine, or the like, or on a hood in a case where the hood is provided.

Figure 17:
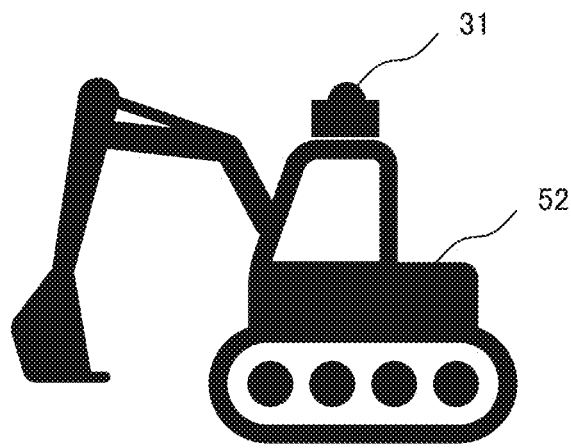
FIG. 17 is an explanatory diagram illustrating an example in which a sensor unit is mounted on a construction machine.

FIG. 17 is an explanatory diagram illustrating an example in which the sensor unit is mounted on a construction machine. In FIG. 17, the sensor unit 31 is mounted above a seat where an operator of the construction machine 52 operates, but a position where the sensor unit 31 is mounted is not particularly limited.

The viewpoint planning device 30 integrates data captured so far while changing the viewpoint in such a way as to reduce a missing portion of information of an object, and acquires information indicating the object and the periphery of the object. In a case where the missing portion of the information due to obstructing or the like is small, for example, in a case where the number of directions indicating the unknown region is equal to or less than a threshold value, the viewpoint planning device 30 calculates, by simulation, obstructing that occurs in each object from the data that has been captured so far and integrated, and determines, as the imaging position of the sensor unit 31, a viewpoint at which a missing portion of information of each object is minimized or a viewpoint at which information of the missing portion of the object can be obtained the most. The threshold value for determining whether the number of directions indicating the unknown region is large may be determined by the user. The viewpoint planning device 30 may determine whether the number of missing portions in the object information is large or small based on the number of point clouds. For example, the viewpoint planning device 30 determines, as the imaging position of the sensor unit 31, a viewpoint when information of an object having the largest number of point clouds is obtained in the simulation.

In a case where the user desires to change the imaging position of the sensor unit 31 determined by the viewpoint planning device 30, the reception unit 51 receives the imaging position. Then, the reception unit 51 may receive the input via an input device. The type of the input device is not particularly limited. The input device may be, for example, a keyboard, a mouse, or the like. For example, the input device may be an input/output device. Examples of the input/output device include a touch panel display. The reception unit 51 outputs the received information to the viewpoint planning device 30. As a result, the reception unit 51 may execute processing of adjusting the imaging position of the sensor unit 31 according to the timing of the user. The viewpoint planning device 30 may finely adjust the imaging position of the sensor unit 31 specified by the user.

The reception unit 51 may receive the imaging position of the sensor unit 31, regardless of the case where the user desires to change the imaging position of the sensor unit 31 determined by the viewpoint planning device 30. Then, the imaging position control unit 307 controls the position of the imaging device in such a way that the sensor unit 31 is at a specified position.

This is the end of the description of Examples. Each example embodiment is not limited to the above-described examples. For example, in a case where the processing unit 32, the sensor unit 31, and the robot arm 33 included in the viewpoint planning device 30 are implemented by different devices, the reception unit 51 may be implemented by the same device as the processing unit 32. As in the following modifications, an output unit (not illustrated) or the like may be provided in each device.

Modifications

The output unit outputs each piece of data obtained by each functional unit. Specifically, for example, the output unit (storage control unit) may store each piece of the data in a memory or the like. The output unit (transmission unit) may transmit each piece of the data to another device via a communication network. The output unit (display control unit) may for example, display a screen including each piece of the data on a display device or the like. The display device may be provided in the same device as each functional unit, or may be connected to a device that implements each functional unit via a communication network or a wire.

When a search direction indicating an unknown region is identified, the output unit may output the identified search direction indicating the unknown region. Outputting the search direction means outputting information relating to the search direction. For example, the information relating to the search direction may be a coordinate position in the search direction, or is not particularly limited. For example, the output unit may output data obtained by superimposing the direction indicating the unknown region on captured data. More specifically, for example, the output unit may store, to the memory, the data obtained by superimposing the direction indicating the unknown region on the captured data. For example, the output unit may display a screen including the data obtained by superimposing the direction indicating the unknown region on the captured data on the display device. For example, the output unit may transmit, to another device, the data obtained by superimposing the direction indicating the unknown region on the captured data. The another device is not particularly limited. The another device may be, for example, a terminal device of the user. For example, the reception unit 51 described in Example 2 may receive specifying of the imaging position of the sensor unit 31 after the output unit outputs the search direction. Then, the imaging position control unit 307 controls the position of the imaging device in such a way that the sensor unit 31 is at a specified position.

The output unit may output, for example, a candidate for the viewpoint set by at least one of the viewpoint determination unit 206, the first viewpoint determination unit 306, and the second viewpoint determination unit 308. As described above, the output method is not particularly limited. For example, the output unit may display a screen on which a candidate is arranged on the virtual space on the display device. For example, the reception unit 51 described in Example 2 may receive specifying of the imaging position of the sensor unit 31 after the candidate for the viewpoint is output by the output unit. Then, the imaging position control unit 307 controls the position of the imaging device in such a way that the sensor unit 31 is at a specified position. For example, the reception unit 51 described in Example 2 may receive whether to adopt the candidate for the viewpoint after the candidate for the viewpoint is output by the output unit. Then, the viewpoint determination unit 206, the first viewpoint determination unit 306, and the second viewpoint determination unit 308 may set a new candidate when receiving that the candidate for the viewpoint is not adopted.

For example, the output unit may output the next viewpoint determined by at least one of the viewpoint determination unit 206, the first viewpoint determination unit 306, and the second viewpoint determination unit 308. As described above, the output method is not particularly limited. For example, the output unit may display, on the display device, a screen on which the next viewpoint is arranged on the virtual space. For example, the reception unit 51 described in Example 2 may receive specifying of the imaging position of the sensor unit 31 after the next viewpoint is output by the output unit. For example, in a case where the user wants to confirm the next viewpoint and correct the next viewpoint, the user specifies the imaging position of the sensor unit 31. Then, the imaging position control unit 307 controls the position of the imaging device in such a way that the sensor unit 31 is at a specified position. For example, the reception unit 51 described in Example 2 may receive whether to adopt the candidate for the viewpoint after the candidate for the viewpoint is output by the output unit. Then, the viewpoint determination unit 206, the first viewpoint determination unit 306, and the second viewpoint determination unit 308 may set a new candidate when receiving that the candidate for the viewpoint is not adopted.

Fourth Example Embodiment

Figure 18:
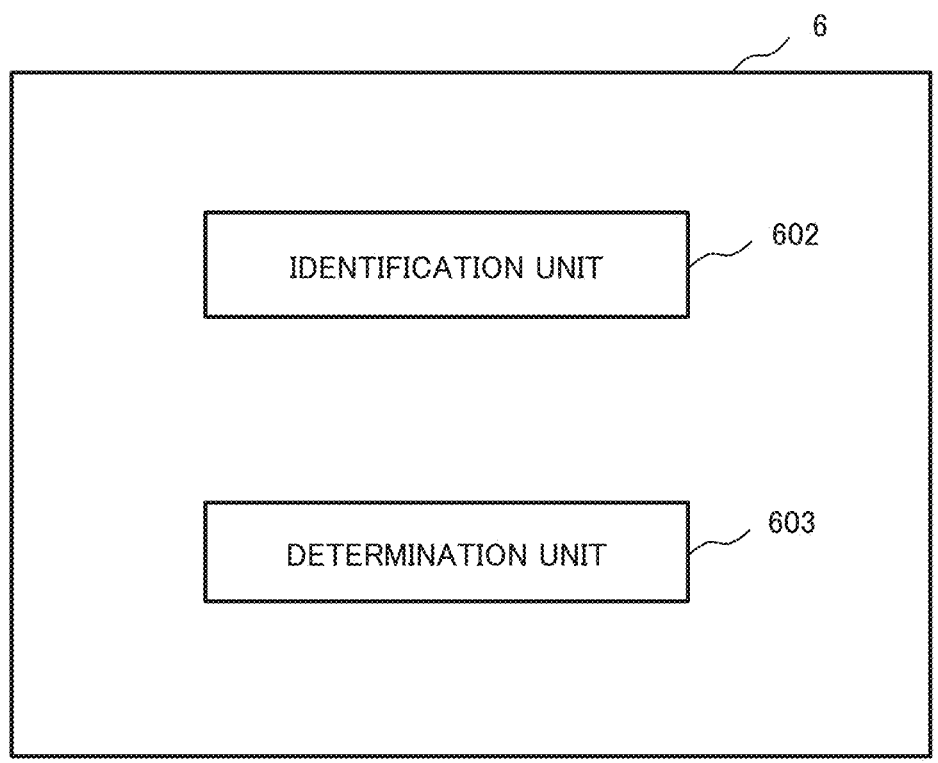
FIG. 18 is a block diagram illustrating a configuration example of a determination device according to a fourth example embodiment.

In a fourth example embodiment, a basic function of a system of the present disclosure will be described. FIG. 18 is a block diagram illustrating a configuration example of an identification system according to the fourth example embodiment. A determination device 6 includes, for example, an identification unit 602 and a determination unit 603. A processing result of each functional unit may be stored in, for example, a memory to be described later.

The identification unit 602 is the basic functions of the search direction identification units 102, 203, and 303 described in the above example embodiments. The determination unit 603 is the basic functions of the unknown region determination units 103, 204, and 304 described in the above-described example embodiments.

The identification unit 602 identifies a direction extending from inside to outside of an object in image data or position data. As described in the first example embodiment, a method of identifying each direction by the identification unit 602 is not particularly limited. For example, the identification unit 602 may identify each direction to the outside from the center position of the object in the image data or the position data. When the position data is three-dimensional point cloud data, the identification unit 602 searches for a neighboring point from a point (anchor point) present near the center of the object in the three-dimensional point cloud data indicating the object. Then, the identification unit 602 identifies a direction from the anchor point to the neighboring point. The identification unit 602 may newly search for a neighboring point using the searched neighboring point as a new anchor point. Accordingly, the identification unit 602 can identify each direction extending from inside to outside of the object.

Next, the determination unit 603 determines whether the identified direction satisfies the criteria indicating that information relating to the object is missing. The criteria are that, for example, in a case where an end point in the identified direction is set as a start point, the number of points within a predetermined distance from the start point is not equal to or larger than a predetermined number. The start point of the direction and the end point of the direction are, for example, pixels in the case of the image data. The start point of the direction and the end point of the direction are points, for example, in the case of the point cloud data.

Figure 19:
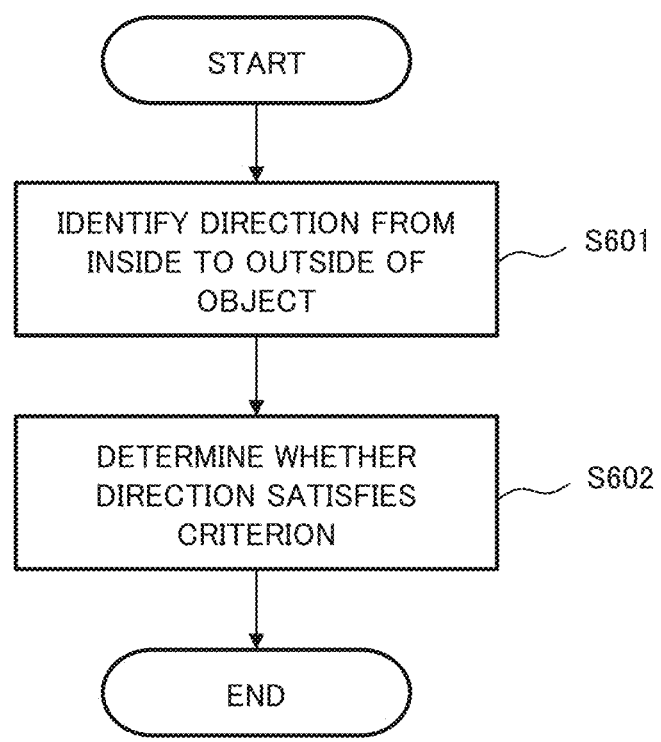
FIG. 19 is a flowchart illustrating an operation example of the determination device according to the fourth example embodiment.

FIG. 19 is a flowchart illustrating an example of a specific processing procedure of the determination device 6 according to the fourth example embodiment. First, the identification unit 602 identifies a direction extending from inside to outside of an object in image data or position data (step S601). Then, the determination unit 603 determines whether the identified direction satisfies the criteria indicating that information relating to the object is missing (step S602). The determination device 6 ends the processing.

The configuration of the determination device 6 is not particularly limited. The determination device 6 may be implemented by one device. The determination device 6 may be implemented by devices different for each function or for each piece of data. For example, each functional unit of the determination device 6 may be implemented by one device or may be implemented by different devices.

This is the end of the description of each example embodiment and modification. Each example embodiment and modification may be combined. The combination is not particularly limited. Each functional unit described in each example embodiment and modification may be implemented by one device or may be implemented by a plurality of devices. Specifically, each functional unit may be implemented by a plurality of devices. Each device described in each example embodiment may include a functional unit (not illustrated) as in a modification. Each device described in each example embodiment may have a configuration including some functional units. For example, a control device (not illustrated) including the search direction identification unit 203, the viewpoint determination unit 206, and the imaging position control unit 207 may be implemented. For example, a control device (not illustrated) including the search direction identification unit 303, the first viewpoint determination unit 306 or the second viewpoint determination unit 308, and the imaging position control unit 307 may be implemented.

Each functional unit of the control device (not illustrated) will be described. The search direction identification unit 203 and the search direction identification unit 303 are collectively referred to as a search direction identification unit. The viewpoint determination unit 206, the first viewpoint determination unit 306, and the second viewpoint determination unit 308 in the control device are collectively referred to as a determination unit. The imaging position control unit 207 and the imaging position control unit 307 are collectively referred to as a control unit.

The search direction identification unit identifies a direction extending from inside to outside of an object in image data or position data generated by the imaging device.

In a case where the identified direction satisfies the criteria indicating that information relating to the object is missing, the determination unit determines the position of the imaging device in such a way that the angle of view of the imaging device includes the direction. For example, as described in the second example embodiment and the third example embodiment, the determination unit may use the position data, and the control unit controls the position of the imaging device in such a way that the imaging device is at the determined position. For example, in a case where the device is mounted on the mobile object or the like, the control unit may control the mobile object in such a way that the imaging device is at the determined position.

As a result, in a case where information relating to the object is missing, the control device can cause the imaging device to perform image capturing in such a way as to be able to capture an image of the missing portion. For example, the control device can assist in capturing an image of the missing portion with a smaller number of times of image capturing than in a case where the object is randomized.

(Example of Hardware Configuration of Computer)

Figure 20:
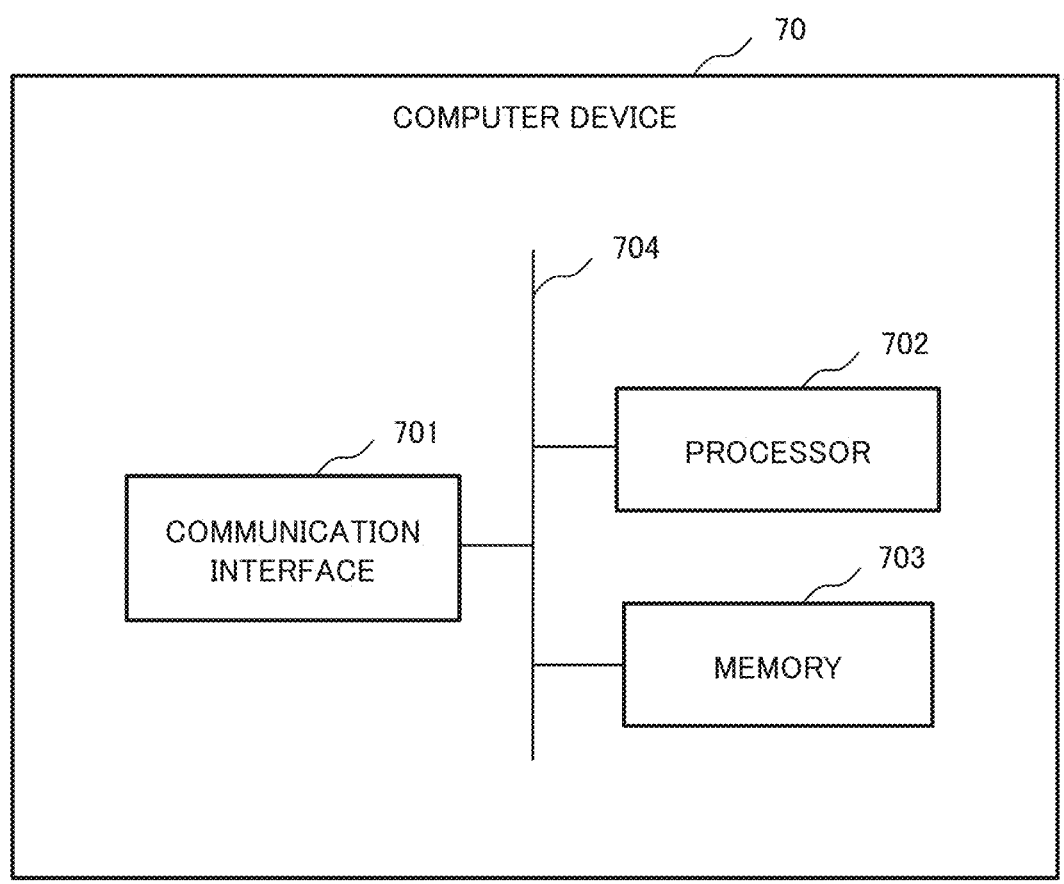
FIG. 20 is a block diagram illustrating an example of a hardware configuration of a computer device.

Next, an example in which each of the devices included in the unknown region identifying device 10, the viewpoint planning devices 20 and 30, and the like described in the above-described example embodiments is implemented by a computer device will be described. FIG. 20 is a block diagram illustrating an example of a hardware configuration of the computer device. Referring to FIG. 20, the computer device 70 includes a communication interface 701, a processor 702, and a memory 703. The communication interface 701, the processor 702, and the memory 703 are connected via, for example, a bus 704.

The communication interface 701 is used to communicate with other devices such as an input device and a robot device. The communication interface 701 is connected to a communication network such as a local area network (LAN) or a wide area network (WAN) via a wireless or wired communication line. As a result, the computer device 70 is connected to an external device or an external computer via the communication network. The communication interface serves as an interface between the communication network and the inside of the computer device 70. The communication interface controls input and output of data from the external device and the external computer.

The processor 702 controls the entire computer device 70. The processor 702 loads a program stored in the memory 703. Then, the processor 702 executes each process coded in the program. As a result, the processor 702 performs each processing described using the flowcharts in the above-described example embodiment based on the program. The processor 702 may be, for example, a microprocessor (micro processing unit (MPU)), a CPU, digital signal processor (DSP), or a GPU. The processor 702 may include a plurality of processors.

The memory 703 is constituted by a combination of a volatile memory and a nonvolatile memory. The memory 703 may include a storage located away from the processor 702. In this case, the processor 702 may access the connected memory 703 via an input/output (I/O) interface (not illustrated). The processor 702 may access the memory 703 connected via a communication network (not illustrated).

In the example illustrated in FIG. 20, the memory 703 is used to store a software module group such as the program. The processor 702 can perform the processing of each device described in the above-described example embodiments by reading the software module group from the memory 703 and executing the software module group.

The processor 702 may download various programs via a communication network (not illustrated). Then, the processor 702 stores the various programs to the memory 703.

As described with reference to FIG. 20, the processor 702 included in each computer device 70 executes one or a plurality of programs including a command group for causing a computer to perform the algorithm described with reference to the drawings.

The hardware configuration of the computer device 70 is an example. The computer device 70 may have a configuration including some components illustrated in FIG. 20. The computer device 70 may have components other than those illustrated in FIG. 20. For example, the computer device 70 may include a drive device or the like. Then, the processor 702 may read the program or data from a non-transitory computer readable medium attached to the drive device or the like to the memory 703.

In this manner, the program may be stored in the non-transitory computer readable medium. The program can be supplied from the recording medium to the computer by the processor. Non-transitory computer-readable media include various types of tangible recording media. Examples of the non-transitory computer-readable media include magnetic recording media (for example, a flexible disk, a magnetic tape, and a hard disk drive), and magneto-optical recording media (for example, magneto-optical disks). Examples of the non-transitory computer-readable media include a read only memory (CD-ROM), a CD-R, and a CD-R/W. Examples of the non-transitory computer-readable media include semiconductor memories. The semiconductor memories include, for example, a mask ROM, a programmable ROM (PROM), an erasable PROM (EPROM), a flash ROM, and a random access memory (RAM). The program may be supplied to the computer by various types of transitory computer readable media. Examples of the transitory computer-readable media include an electrical signal, an optical signal, and an electromagnetic wave. The transitory computer-readable media can supply the program to the computer via a wired communication path such as an electric wire and an optical fiber, or a wireless communication path.

For example, the computer device 70 may include an input device such as a keyboard and a mouse. The computer device 70 may include an output device such as a display. The computer device 70 may include an input device and an output device like a PC.

The computer device 70 includes an input/output interface, and the input/output interface is connected to at least one of an input device, an output device, and an input/output device. The connection method may be wireless or wired. Examples of the input device include a keyboard, a mouse, and a microphone. Examples of the output device include a display device, a lighting device, and a speaker that outputs sound. Examples of the input/output device include a touch panel display. The input device, the output device, the input/output device, and the like may be built in the computer device 70 or may be externally attached to the computer device 70.

This is the end of the description of the hardware configuration of each device. There are various modifications of a method of implementing each of the devices. For example, each of the devices may be implemented by an arbitrary combination of a computer different for each component and the program. A plurality of components included in each of the devices may be implemented by an arbitrary combination of one computer and the program.

A part or all of each component of each device may be implemented by an application specific circuit. A part or all of each device may be implemented by a general-purpose circuit including a processor such as a field programmable gate array (FPGA). A part or all of each device may be implemented by a combination of an application specific circuit, a general-purpose circuit, and the like. These circuits may be a single integrated circuit. Alternatively, these circuits may be divided into a plurality of integrated circuits.

The plurality of integrated circuits may be configured by being connected via a bus 704 or the like.

In a case where some or all of components of each of the devices are implemented by a plurality of computers, circuits, or the like, the plurality of computers, circuits, or the like may be arranged in a centralized manner or in a distributed manner.

The methods described in each example embodiment are implemented by execution by the computer, for example. The methods are implemented by the computer executing the program prepared in advance. As described above, the program described in each example embodiment is recorded in a non-transitory computer-readable recording medium. Then, the program is executed by being read from the recording medium by the computer. As described above, the program may be distributed via a communication network.

The functions of the components of the identification system in each example embodiment described above may be implemented as hardware like the computer device 70 illustrated in FIG. 20. Alternatively, each component may be implemented by the computer device 70 based on program control and firmware.

Although the present disclosure has been described with reference to the example embodiments, the present disclosure is not limited to the example embodiments. Each configuration and details of the present disclosure may include example embodiments to which various changes that can be grasped by those skilled in the art within the scope of the present disclosure are applied. The present disclosure may include example embodiments in which the matters described in the present specification are appropriately combined or replaced as necessary. For example, the matters described using a specific example embodiment can be applied to the other example embodiments as long as no contradiction occurs. For example, although the plurality of operations is described in order in the form of the flowcharts, the order of the description does not limit the order of executing the plurality of operations. Therefore, when each example embodiment is implemented, the order of the plurality of operations can be changed to the extent that the order does not affect the content.

A part or all of the above example embodiments can also be described as the following supplementary notes. However, some or all of the above example embodiments are not limited to the following.

(Supplementary Note 1)
A determination device including:
an identification means that identifies a direction extending from inside to outside of an object in image data or position data; and
a determination means that determines whether the identified direction satisfies criteria indicating that information relating to the object is missing.

(Supplementary Note 2)
The determination device according to Supplementary Note 1, further including:
an output means that outputs information relating to the identified direction in a case where the identified direction satisfies the criteria.

(Supplementary Note 3)
The determination device according to Supplementary Note 2, in which
the output means superimposes the identified direction on the image data or the position data, and outputs the identified direction superimposed on the image data or the position data.

(Supplementary Note 4)
The determination device according to Supplementary Note 2 or 3, further including:
a control means that controls a position of the imaging device in such a way that the imaging device is at a specified position.

(Supplementary Note 5)
The determination device according to Supplementary Note 4, further including:
a reception means that receives specifying of the position of the imaging device, in which
the control means controls the position of the imaging device in such a way that the imaging device is at the specified position.

(Supplementary Note 6)
The determination device according to any one of Supplementary Notes 1 to 3, further including:
a determination means that determines a position of the imaging device in such a way that an angle of view of the imaging device includes the direction in a case where the identified direction satisfies the criteria; and
a control means that controls the imaging device in such a way that the imaging device is at the determined position.

(Supplementary Note 7)
The determination device according to Supplementary Note 6, in which
the control means controls a mobile object on which the imaging device is mounted in such a way that the imaging device is at the determined position.

(Supplementary Note 8)
The determination device according to Supplementary Note 6 or 7, in which
the determination means determines the position of the imaging device from candidates for the position of the imaging device in such a way that the angle of view of the imaging device includes the direction.

(Supplementary Note 9)
A control device including:
an identification means that identifies a direction extending from inside to outside of an object in image data or position data generated by an imaging device;
a determination means that determines a position of the imaging device in such a way that an angle of view of the imaging device includes the direction in a case where the identified direction satisfies criteria indicating that information relating to the object is missing; and
a control means that controls the position of the imaging device in such a way that the imaging device is at the position.

(Supplementary Note 10)
An identification method including:
identifying a direction extending from inside to outside of an object in image data or position data; and
determining whether the identified direction satisfies criteria indicating that information relating to the object is missing.

(Supplementary Note 11)
A control method including:
identifying a direction extending from inside to outside of an object in image data or position data generated by an imaging device;
determining a position of the imaging device in such a way that an angle of view of the imaging device includes the direction in a case where the identified direction satisfies criteria indicating that information relating to the object is missing; and controlling the position of the imaging device in such a way that the imaging device is at the position.

(Supplementary Note 12)

A recording medium readable by a computer, the recording medium recording a program for causing the computer to execute processing of:
identifying a direction extending from inside to outside of an object in image data or position data; and
determining whether the identified direction satisfies criteria indicating that information relating to the object is missing.

(Supplementary Note 13)

A recording medium readable by a computer, the recording medium recording a program for causing the computer to execute processing of:
identifying a direction extending from inside to outside of an object in image data or position data generated by an imaging device;
determining a position of the imaging device in such a way that an angle of view of the imaging device includes the direction in a case where the identified direction satisfies criteria indicating that information relating to the object is missing; and
controlling the position of the imaging device in such a way that the imaging device is at the position.

(Supplementary Note 14)

A program for causing a computer to execute processing of:
identifying a direction extending from inside to outside of an object in image data or position data; and
determining whether the identified direction satisfies criteria indicating that information relating to the object is missing.

(Supplementary Note 15)

A program for causing a computer to execute processing of:
identifying a direction extending from inside to outside of an object in image data or position data generated by an imaging device;
determining a position of the imaging device in such a way that an angle of view of the imaging device includes the direction in a case where the identified direction satisfies criteria indicating that information relating to the object is missing; and
controlling the position of the imaging device in such a way that the imaging device is at the position.

REFERENCE SIGNS LIST 10 unknown region identifying device
11, 21, 31 sensor unit
12, 22, 32 processing unit
41 recognition device
51 reception unit
101, 202, 302 object identification unit
102, 203, 303 search direction identification unit
103, 204, 304 unknown region determination unit
20, 30 viewpoint planning device
23, 33 robot arm
206 viewpoint determination unit
207, 307 imaging position control unit
306 first viewpoint determination unit
308 second viewpoint determination unit
602 identification unit
603 determination unit
6 determination device
70 computer device
701 communication interface
702 processor
703 memory

What is claimed is:

1. A determination device comprising:
at least one memory storing instructions; and
at least one processor configured to execute the instructions to:
select a start point in a position data, the position data being a three-dimensional point cloud data indicating an object;
select an end point within a predetermined distance from the start point as an end point in the three-dimensional point cloud data;
identify a direction from the start point to the end point;
until there are no unselected points that can be selected as a start point, iteratively:
select the end point as a new start point,
select a point within the predetermined distance from the new start point as a new end point in the three-dimensional point cloud data, wherein the new end point is selected from points that have not been previously selected as a start point, and
identify a direction from the new start point to the new end point; and
determine whether the identified direction satisfies criteria indicating that information relating to the object is missing, wherein the criteria is satisfied when the number of points within the predetermined distance from an end point in the identified direction is less than or equal to a predetermined number.

2. The determination device according to claim 1, wherein the at least one processor is further configured to execute the instructions to:
output information relating to the identified direction in a case where the identified direction satisfies the criteria.

3. The determination device according to claim 2, wherein the at least one processor is further configured to execute the instructions to:
output data superimposing the identified direction on the image data or the position data.

4. The determination device according to claim 2, wherein the at least one processor is further configured to execute the instructions to:
control a position of the imaging device that captures an image of the object in such a way that the imaging device is at a specified position.

5. The determination device according to claim 4, wherein the at least one processor is further configured to execute the instructions to:
receive specifying of the position of the imaging device; and
control the position of the imaging device in such a way that the imaging device is at the specified position.

6. The determination device according to claim 1, wherein the at least one processor is further configured to execute the instructions to:
determine a position of the imaging device in such a way that an angle of view of the imaging device includes the direction in a case where the identified direction satisfies the criteria; and
control the imaging device in such a way that the imaging device is at the determined position.

7. The determination device according to claim 6, wherein the at least one processor is further configured to execute the instructions to:
control a mobile object on which the imaging device is mounted in such a way that the imaging device is at the determined position.

8. The determination device according to claim 6, wherein the at least one processor is further configured to execute the instructions to:
determine the position of the imaging device from candidates for the position of the imaging device in such a way that the angle of view of the imaging device includes the direction.

9. An identification method comprising:
selecting a start point in a position data, the position data being a three-dimensional point cloud data indicating an object;
selecting an end point within a predetermined distance from the start point as an end point in the three-dimensional point cloud data;
identifying a direction from the start point to the end point;
until there are no unselected points that can be selected as a start point, iteratively:
  selecting the end point as a new start point,
  selecting a point within the predetermined distance from the new start point as a new end point in the three-dimensional point cloud data, wherein the new end point is selected from points that have not been previously selected as a start point, and
  identifying a direction from the new start point to the new end point; and
determining whether the identified direction satisfies criteria indicating that information relating to the object is missing, wherein the criteria is satisfied when the number of points within the predetermined distance from an end point in the identified direction is less than or equal to a predetermined number.

10. A non-transitory recording medium readable by a computer, the recording medium recording a program for causing the computer to execute processing of:
selecting a start point in a position data, the position data being a three-dimensional point cloud data indicating an object;
selecting an end point within a predetermined distance from the start point as an end point in the three-dimensional point cloud data;
identifying a direction from the start point to the end point;
until there are no unselected points that can be selected as a start point, iteratively:
  selecting the end point as a new start point,
  selecting a point within the predetermined distance from the new start point as a new end point in the three-dimensional point cloud data, wherein the new end point is selected from points that have not been previously selected as a start point, and
  identifying a direction from the new start point to the new end point; and
determining whether the identified direction satisfies criteria indicating that information relating to the object is missing, wherein the criteria is satisfied when the number of points within the predetermined distance from an end point in the identified direction is less than or equal to a predetermined number.

* * * * *